United States Patent [19]
Browning et al.

[11] Patent Number: 5,914,817
[45] Date of Patent: Jun. 22, 1999

[54] THIN FILM DICHROIC COLOR SEPARATION FILTERS FOR COLOR SPLITTERS IN LIQUID CRYSTAL DISPLAY SYSTEMS

[75] Inventors: Stephen D. Browning; Paul M. LeFebvre; Basil Swaby, all of Santa Rosa, Calif.

[73] Assignee: Optical Coating Laboratory, Inc., Santa Rosa, Calif.

[21] Appl. No.: 09/079,997

[22] Filed: May 15, 1998

[51] Int. Cl.$^6$ .............................. G02B 5/28; G02B 27/14; H04N 9/31

[52] U.S. Cl. .......................... 359/634; 359/586; 359/588; 359/589; 359/629; 359/638; 359/640; 204/471; 204/192.26; 204/192.27; 204/192.28; 204/198.29; 349/5; 349/9; 349/57; 349/105

[58] Field of Search ..................... 359/577–589, 359/629, 634, 638, 640, 833–837, 292, 301; 204/192.26–192.29, 471; 65/430; 349/5, 9, 57, 105

[56] References Cited

U.S. PATENT DOCUMENTS

| | | | |
|---|---|---|---|
| 4,009,941 | 3/1977 | Verdijk et al. | 350/173 |
| 4,373,782 | 2/1983 | Thelen | 350/166 |
| 4,770,496 | 9/1988 | Mahlein | 350/166 |
| 4,851,095 | 7/1989 | Scobey et al. | 204/192.12 |
| 5,042,912 | 8/1991 | Sato et al. | 359/638 |
| 5,225,057 | 7/1993 | LeFebvre et al. | 204/192.13 |
| 5,513,039 | 4/1996 | Lu et al. | 359/584 |
| 5,600,487 | 2/1997 | Kiyomoto et al. | 359/634 |
| 5,621,486 | 4/1997 | Doany et al. | 348/756 |
| 5,625,491 | 4/1997 | von Gunten et al. | 359/487 |
| 5,670,030 | 9/1997 | Solberg et al. | 204/192.26 |

OTHER PUBLICATIONS

J.P. Lehan, R.B. Sargent, and, R.E. Klinger, "High–Rate Aluminum Oxide Deposition by MetaMode Reactive Sputtering," J. Vac. Sci. Technol. A 10(6), pp. 3401–3406, Nov/Dec 1992.

J.W. Seeser, P.M. LeFebvre, B.P. Hichwa, J.P. Lehan, S.F. Rowlands, and T.H. Allen, "Meta–Mode Reactive Sputtering: A New Way to Make Thin Film Products," Society of Vacuum Coaters 505/298–7624, 35t Annual Technical Conference Proceedings (1992), pp. 229–235.

Alfred Thelan, "Avoidance of Enhancement of Polarization in Multilayers," J. Opt. Soc. Am., vol. 70, No. 1, pp. 118–121, Jan. 1980.

Internet publication entitled "Exposing the Digital Image on Film," Internet website for Kodak. Applicant first become aware of this internet publication on Jul. 30, 1998. Applicant is unaware when it was first available.

Internet publication entitled "Technical Specifications" Internet website for Kodak . Applicant first became.

Primary Examiner—Georgia Epps
Assistant Examiner—David N. Spector
Attorney, Agent, or Firm—Workman, Nydegger & Seeley

[57] ABSTRACT

An optical filter is provided for use in color projection display imaging systems which utilize liquid crystal light valves for image modulation. The optical filter is a dichroic coating which separates light into different colors. The optical filter is located on a light transmissive surface of a color splitting device such as a Philips prism. The optical filter is formed from layers of at least two different dielectric materials including a high refractive index material, such as zirconium oxide and a low refractive index material such as aluminum oxide. The low refractive index material has an average refractive index of no less than about 1.6. The high refractive index material has an average refractive index which is sufficiently greater than the average refractive index of the low refractive index such that the average refractive index of the high refractive index material divided by the average refractive index of the low refractive index material yields a ratio that is greater than about 1.2 and less than about 1.55.

57 Claims, 8 Drawing Sheets

THIN FILM DICHROIC COLOR SEPARATION FILTERS FOR COLOR SPLITTERS IN LIQUID CRYSTAL DISPLAY SYSTEMS

BACKGROUND OF THE INVENTION

1. The Field of the Invention

The present invention is related to optical devices for display imaging systems. More particularly, the present invention relates to optical interference filters used to achieve color separation within color projection display imaging systems utilizing liquid crystal light valves for image modulation. The optical interference filters provide improved display brightness and contrast.

2. The Relevant Technology

Projection displays comprise a light source, a polarizing element, a color separation element, reflective imagers such as reflective liquid crystal valves with appropriate drive circuitry, and image projection optics. The polarizing element receives light from the light source and directs one polarization state to the color splitter and transmits the other polarization state. The color splitter utilizes optical interference filters to separate the broad spectrum of light it receives from the light source into three primary colors, directing the separate colors towards the reflective liquid crystal light valves. When the individual pixels of the liquid crystal light valves are activated to an "on" state, they reverse the polarization of incident light upon reflection. The light reflected from the imager is recombined within the color splitter and re-directed to the polarizing element. The polarizing element then acts as an analyzer and transmits light which has undergone a reversal of polarization state at the liquid crystal light valve into the image projection optics, wherein an image is projected that is observable by a viewer. Since light which is not reversed in polarization by the liquid crystal light valve is not transmitted to the image projection optics, the final image is formed from the selected pixels of the three imagers and consists of the three primary colors.

The optical interference filters used in the color splitter are dichroic mirrors designed to reflect and transmit discrete wavelength ranges. Spectral characteristics of these coatings control the display color purity, brightness and contrast. More specifically, the spectral characteristics must be considered over an angular range of incident light controlled by the f# representative of the optical system for S and P planes of polarized light.

The spectral characteristics of optical interference filters or coatings must be considered over an angular range of incident light as such coatings vary in performance with the angle of incidence. To appreciate the potential for variation in spectral characteristics, consider the angular range of incident light which, for example, has a central ray at 30° and has a 10° cone. The resulting angle of incidence will range from 20° to 40°. The difficulties presented in separating light into different colors having the desired characteristics when the light is incident on the dichroic coating with such a broad angular range of incident light become more exaggerated at high angles of incidence. High angles of incidence are generally angles of about 20° or greater.

One of the spectral characteristics impacted by the angular range of incident light which is particularly exaggerated at high angles of incidence is known as angle shift. In an edge or band pass filter, a transition region between the pass band, or high transmission region, and stop band, high reflection region, will shift towards shorter wavelengths with increasing angle of incidence.

Additionally, the S polarization state will shift a greater amount than the P polarization state with angle of incidence. The difference in shift with angle of incidence is known as "polarization splitting" and will result in decreased light transmission. The decreased light transmission occurs because of the double pass nature of the color projection display imaging system, wherein light representing the pixels in the "on" state must be transmitted in one polarization state and reflected in another to be transmitted through the polarizing element into the image projection optics. The average transmitted intensity is proportional to the product of the S and P reflectivities at a given wavelength. Thus, polarization splitting reduces the wavelength range of light available from the light source to form the image.

Several design methods can be used to achieve non-polarizing dichroic coatings; however, the non-polarizing characteristic is limited to a fixed angle of incidence. In practice the system must be optimized to deal with the range of divergent angles. This requires a compromise between two characteristic properties of interference coatings at increasing angles of incidence: 1) the shift of the spectral curve shape towards shorter wavelengths; and 2) increased separation between the S and P polarization states.

This problem can be solved to some extent by using non-polarizing filter designs which align the transition region of both polarization states at one edge, or side, of the filter's pass band. Such design methods for two coating materials are taught by Alfred Thelen in his text entitled *Design of Optical Interference Cotig* (1989) which is incorporated by reference, and also in U.S. Pat. No. 4,373,782, issued to Thelen which is also hereby incorporated by reference. The optical thin film filter disclosed in the Thelen patent reduces the polarization splitting through the use of carefully designed stacks of low and high refractive index materials which were respectively, $n_L=1.45$ and $n_H=2.28$. The Thelen patent, however, is designed for use at only one preselected angle and is therefore most suited to applications such as wavelength division multiplexing and demultiplexing in a fiber optic communications system. Additionally, the method disclosed by Thelen for designing non-polarizing edge filters, requires complex multilayer designs and more than two coating materials.

Other publications teach how to create non-polarizing edge filters using three coating materials. However, this technique is only effective for a given angle of incidence which requires that the light be completely collimated within the color separation and image formation optical path. Such a system is generally not desirable because it further reduces the total light available from the light source, adds expensive components and increases the size of the optical system.

Accordingly, there is a need for improved optical coatings, devices, systems and methods which overcome or avoid the above difficulties.

SUMMARY AND OBJECTS OF THE INVENTION

The object of the present invention is to provide an optical filter that produces high contrast images in projection displays having a large angle of incident light.

Another object of the present invention is to provide an optical filter having a coating that is relatively non-polarizing over a wide angular range.

A further object of the present invention is to provide an optical coating for an optical filter that minimizes spectral shift over a wide angular range.

An additional object of the present invention is to provide a low cost method of depositing an optical coating for fabricating an optical filter.

To achieve the foregoing objects, and in accordance with the invention as embodied and broadly described herein, the present invention provides an optical filter which is particularly useful for visible wavelengths incident at relatively high angles. Additionally, the present invention provides an economical solution through the use of a select range of coating materials to minimize the polarization splitting over a sufficient range of angle of incidence, while providing efficient color separation to achieve standard requirements for color purity. This provides the desired performance at the lowest manufacturing cost using a select range of coating materials in a preferred deposition process. The process utilized in the present invention deposits the coating materials such that they possess the required optical properties in high yields and at high deposition rates.

More specifically, the objective of the invention is achieved by selection of coating materials having a numerical relationship between refractive indices. The preferred materials within this range have useful optical properties for this application, particularly when deposited by a reactive sputtering processes.

The alternating layers of the coating are two distinct dielectric materials having a relatively high average refractive index. The dielectric materials have a preferred ratio of refractive index in a range from about 1.2 to about 1.55 and more preferably a ratio that is greater than about 1.2 and less than about 1.55. The coating is applied to a color separating filter element, such as a Philips prism, used in a liquid crystal light valve display system. The coating materials utilized in the present invention are preferably deposited by reactive sputtering in which the reactive sputtering process occurs in the metallic mode wherein oxidation is remote from the sputtering target. The coating materials have low absorption and scatter. The coating materials are deposited consistently over time and uniformly over the effective coating zone of the sputter cathode to form substantially conductive thin films in the vicinity of the cathode that is not the substrate. The coating materials are deposited to at high rates and the cost of the metallic target materials is relatively low. The stress in the deposited coating materials is not excessively high.

The preferred low index material is aluminum oxide and the preferred high refractive index material is zirconium dioxide. These materials can be deposited at high rates with good deposition stability and are within the range of desired refractive indices. The desired spectral performance is achieved without an excessive number of coating layers. The number of coating layers that are excessive from an economic viewpoint is relative to the deposition rate. The high deposition rate and stability of deposition for the preferred low index material is one of the unexpected benefits.

Additionally, the preferred coating materials have sufficiently low absorption as deposited that a post deposition treatment (oxidation at elevated temperatures) is not required to obtain satisfactory transmission in the pass band.

This process provides an economical solution for dichroic mirror coatings that improve the performance of liquid crystal light valve-projection displays, by increasing image contrast.

These and other features and advantages of the invention will be better understood by reference to the detailed description, or will be appreciated by the practice of the invention.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof illustrated in the appended drawings. Understanding that these drawings depict only typical embodiments of the invention and are not therefore to be considered limiting of its scope, the invention will be described and explained with additional specificity and detail through the use of the accompanying drawings as listed hereinbelow.

FIG. 3 is discussed in Examples 2B and is summarized in Example 2A.

FIG. 4 is discussed in Examples 2B and is summarized in Example 2A.

FIG. 5 is discussed in Examples 2C and is summarized in Example 2A.

FIG. 6 is discussed in Examples 2C and is summarized in Example 2A.

FIG. 7 is discussed in Examples 2D and is summarized in Example 2A.

FIG. 8 is discussed in Examples 2D and is summarized in Example 2A.

DETAILED DESCRIPTION OF THE INVENTION

Figure 1:
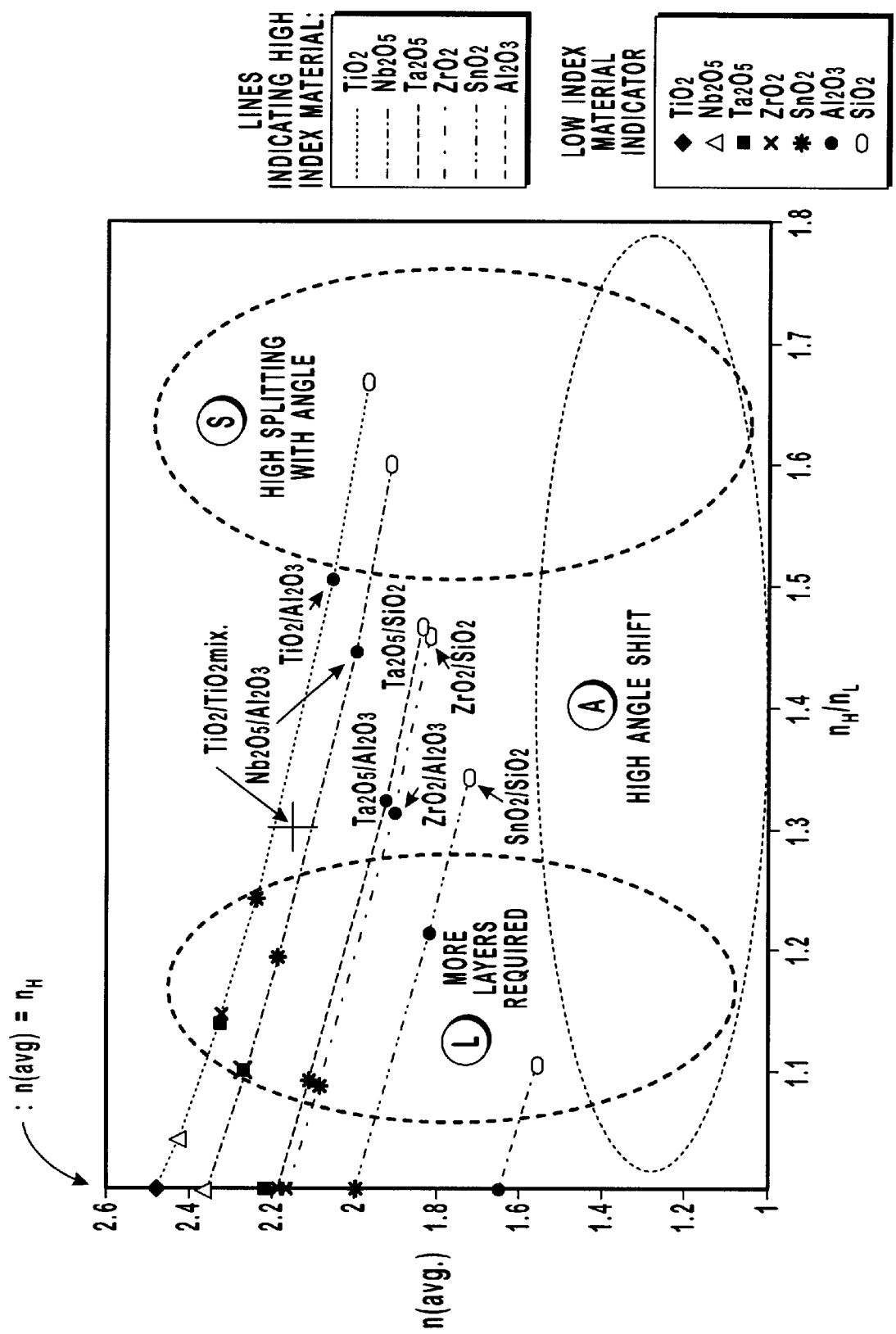
FIG. 1 is a graph relating to materials selection which depicts the relationship between the average refractive index and the refractive index ratio.

The present invention is directed to coatings, apparatus, systems and methods for the separation of light into rays of light having different colors. More particularly, the invention relates to dichroic filters for use in color projection display imaging systems.

The dichroic filters or coatings are utilized on a surface of a color splitter such as a Philips prism which receives light at a high angle of incidence. High angles of incidence are generally angles of about 20° or greater. The angle of incidence on a surface of a color splitters may be as high as 75°, although, high angles of incidence are more typically about 30°.

It has been found that dichroic coatings perform with suitable uniformity over a typical angular range of incident light even at high angles of incidence when the dichroic coatings are designed within particular parameters taught herein. Within these parameters, the angle shift, which is the tendency to shift in performance towards shorter wavelengths as the angle of incidence increases, is minimized. Additionally, within these parameters, polarization splitting, which is the difference in shift of S and P polarized light with angle of incidence, is also minimized. Further, the width of the transition zone between the pass and the stop band is minimized without requiring excessive layers.

One of the parameters which results in optimum system performance is the ratio of refractive indices of the materials used in the optical coating. The ratio, $\rho$, of the refractive index, $n_H$, of the high index of refraction material divided by the refractive index, $n_L$, of the low index of refraction material is expressed as set forth hereinbelow.

$$\rho = n_H/n_L$$

The splitting of S & P polarization planes is reduced as $\rho$ approaches unity. However, as the ratio approaches unity more coating layers are required to achieve a sharp transition. More specifically, additional coating layers are required to achieve a narrow wavelength between the stop and pass bands; high transmission in the pass band; and high reflection in the stop band. Excessive coating layers increase the cost and complexity of manufacturing. Additionally, since coating absorption is another loss mechanism that decreases brightness, coating designs with a large amount of layers preferably use materials and processes to achieve alternating layers of thin film which are essentially free of bulk and interfacial absorption.

It has been found that when the ratio of the refractive indices is less than about 1.2, an excessive number of layers is required in order to achieve sufficient reflectivity of the dichroic coating. Excessive layers are undesirable primarily from the standpoint of economical commercial production. Fifty to sixty layers or more are generally considered to be impractical while thirty to forty layers are generally considered manageable in terms of cost and efficiency. As a result, the preferred low end of the range for the ratio is about 1.2, although, lower ratios may still be practical. For example, ratios such as those greater than about 1.05 may also acceptable. However, use of coatings with ratios as low as about 1.05 may require more layers than those having a ratio of about 1.2 or greater; which may also increase scattering and absorption properties of the coating, as well as the costs.

Minimum splitting of "S" and "P" polarization is required to gain optimal efficiency in liquid crystal light valve display system wherein a given wavelength range of light defines a given color channel. More specifically, excessive polarization splitting limits the usable range of wavelengths of light for a given color channel, thereby reducing efficiency. At a ratio which is above about 1.55, there occurs what is considered to be an unacceptable degree of splitting between S and P polarized light at non-zero angles of incidence. Accordingly, the ratio is in a range from about 1.05 to about 1.55 and is more preferably greater than about 1.05 and less than about 1.55. It is even more preferred, however, that the ratio be in a range from about 1.2 to about 1.55. The most preferred range for the ratio is greater than about 1.2 and less than about 1.55. These index ratios are preferred for dichroic coatings used at high angles of incidence to minimize polarization splitting (non-equal reflectance of S and P polarized incident light).

When the ratio is in this range, one edge of the pass band has S and P polarizations that are preferably separated by less than about 25 nm at their half power wavelength. Additionally, the half power wavelength of both polarization states shift preferably by less than about 25 nm for about a 10° change in the angle of incidence. Further, coatings within the ratio range preferably have one edge of the pass band with S and P polarizations that are separated by less than 50 nm for a 10° change in angle of incidence.

Conventional techniques utilize as high a ratio of refractive indices as possible to reduce the number of layers in the design. The ratio is preferably not less than about 1.2 to reduce polarization splitting without increasing the number of layers substantially, which generally adds cost. Cost is driven by three factors including yield, target material cost, and deposition rate.

Yet another parameter to be considered is the average of the two indices of refraction, $n_{avg}=(n_H+n_L)/2$. It has been found that if the average is below about 1.5, then the spectral curve of the filter is observed to shift towards shorter wavelengths, thereby reducing the efficiency of the filtering properties of the coating. Accordingly, the average refractive index, $n_{avg}$, of the high index of refraction material, $n_H$ and the low index of refraction material $n_L$, is no less than about 1.6. The average refractive index is preferably no less than about 1.7 and more preferably no less than about 1.8. Any combination of alternating layers of a high refractive index material and a low refractive index material may be utilized which have an average which is no less than about 1.6. However, the low refractive index material preferably has an index no less than about 1.6 which requires the high index material to be sufficiently higher than 1.6 such that the resulting ratio is at least about 1.2 and preferably greater than about 1.2.

These parameters are shown in FIG. 1 which graphs the average index of refraction for a variety of materials against the ratio of the refractive index of the high refractive index material divided by that of the low refractive index material. Each line is representative of a particular material used as the high refractive index material and the symbols along each line represent the different materials used as the low refractive material. The lines and symbols representing the respective high and low refractive index materials are set forth in the legend. When the ratio is equal to 1, $n_{avg}=n_H$, which accordingly lists the refractive index for the respective high refractive index materials as: 2.44 for $TiO_2$, 2.38 for $Nb_2O_5$, 2.18 for $Ta_2O_5$, 2.2 for $ZrO_2$, 2.0 for $SnO_2$, 1.66 for $Al_2O_3$ and 1.47 for $SiO_2$.

Three zones, Zones A, L and S, are denoted in FIG. 1 which indicate undesirable combinations of materials. Zone A, located at the lower end of the average index of refraction ordinate, indicates the combination of materials which result in a high angle shift. Zone L, located at the lower end of the ratio abscissa, indicates the combination of materials which require excessive layers. Zone S, located at the high end of the ratio abscissa, indicates the combination of materials which result in high polarization splitting.

The preferred combination of alternating layers is aluminum oxide ($Al_2O_3$) as the low refractive index material with zirconium oxide ($ZrO_2$) as the high refractive index material. Other suitable combinations shown in FIG. 1 are those within the specified parameters for the average index and the index ratio. These exemplary combinations of alternating layers, which are denoted in ratio form, $n_H/n_L$, include: $TiO_2/Al_2O_3$, $Nb_2O_5/Al_2O_3$, $Ta_2O_5/SiO_2$, $Ta_2O_5/Al_2O_3$, $ZrO_2/Al_2O_3$, $ZrO_2/SiO_2$, and $SnO_2/SiO_2$.

As set forth hereinabove, any material may be utilized as either the high or low refractive index materials which have an average index no less than about 1.6 and which yield a ratio that is in a range from about 1.05 to about 1.55 or more preferably a ratio greater than about 1.2 and less than about 1.55. Accordingly, some materials may be utilized as either a high refractive index material or a low refractive index material depending on the refractive index of the other material. Examples of material which may be utilized as either a high or low refractive index material depending on the particular combination of alternating layers include: indium oxide ($In_2O_3$), silicon monoxide (SiO), ($Si_2O_3$), silicon oxynitride, tin dioxide ($SnO_2$), zinc oxide (ZnO), tantalum oxide ($Ta_2O_5$), zirconium oxide ($ZrO_2$), and oxides and nitrides of metal silicides.

Other suitable low refractive index materials may be selected from the group consisting: of magnesium fluoride ($MgF_2$), cryolite ($Na_3AlF_6$), silicon dioxide ($SiO_2$), oxides and nitrides of metal silicides, and mixtures thereof. Examples of metal silicides which may be used to form suitable oxides and nitrides of metal silicides include titanium silicide, tantalum silicide and aluminum silicide. Metal suicides are significantly more conductive than doped silicon and will contribute to the stability of the deposition process, by mechanism in a manner analogous to aluminum targets.

Other suitable high refractive index materials may be selected from the group consisting: hafnium oxide ($HfO_2$), indium oxide ($In_2O_3$,), niobium oxide ($Nb_2O_5$,) silicon nitride ($Si_3N_4$,) silicon oxynitride, tin dioxide ($SnO_2$), titanium dioxide ($TiO_2$), oxides of metal silicides such as titanium silicide and tantalum silicide, tantalum oxide ($Ta_2O_5$), zinc oxide (ZnO), zinc sulfide (ZnS), and mixtures thereof.

Additionally, the low refractive index material and the high refractive index material may each be a mixture of at least two materials. A preferred combination of alternating layers is $TiO_2$ as the high refractive index material with a mixture as the low refractive index material which has a refractive index of about 1.9 and which is a mixture of $TiO_2$ and $Al_2O_3$. The term "$TiO_2$ mix" refers to any mixture of $TiO_2$ and another material, such as $Al_2O_3$, in a ratio such that the mixture has a refractive index of 1.9. An example of a coating formed with $TiO_2$ as the high index material and $TiO_2$ mix as the low index material is denoted in FIG. 1 by a cross symbol. Such mixtures are discussed in greater detail hereinbelow in the section entitled Examples of the Invention. When a mixture is utilized, the indices of the materials in the mixture may have any values as long as the materials are in suitable concentrations such that the resulting mixture material can be used as either the high or the low refractive index material within the parameters described herein. Although, mixtures are useful, the high and the low refractive index materials are preferably formed from a single material.

As indicated hereinabove, other combinations of materials may be utilized, however, the preferred dichroic filters used to separate incident illumination into separate color channels in a liquid crystal light valve display are alternating layers of zirconium oxide and aluminum oxide. The ratio of the refractive indices of these two materials provides improved efficiency of transmitting light from the image formed at the liquid crystal light valve to the viewing screen. Additionally, using these two coating materials affords significant advantages for manufacturing over those of more typically used materials.

The materials that comprise this invention are especially useful when the optical interference coating is deposited by a reactive sputtering process, such as the MetaMode® process as disclosed in U.S. Pat. No. 5,225,057 and U.S. Pat. No. 4,851,095 which are hereby incorporated by reference. In forming the coatings by the MetaMode® process, it is preferable to utilize planar magnetrons having an aspect ratio greater than 2:1. However, any process for obtaining alternating layers of high and low refractive index materials on a surface of a color splitter may be utilized. Accordingly, any deposition or sputtering technique may be utilized, such as an evaporative process, chemical vapor deposition (CVD), RF magnetron sputtering, DC reactive magnetron sputtering processes.

In order to produce such filters economically, the precision of the coating thickness must be controlled to within 1%. This level of precision is difficult to control over the entire length of a sputter target and from run to run in a batch deposition process. While the MetaMode® process exhibits suitable stability for most coating materials, since the target poisoning (oxidation) instability has been eliminated, certain coating materials exhibit instability from another cause.

The primary source of instability arises from non-uniform electrical resistance along the surface acting as an anode of the sputter target, whereby a more conductive anode surface region draws a higher electrical current, resulting in a locally high plasma density and concomitant elevated local sputter deposition rate. The non-uniform resistance in the anode can increase during the sputtering process as the anode surface is coated with metal (in the case of a MetaMode® process) or metal oxide from the target. A preferred coating material, for stability purposes, forms a highly stable conductive metallic film on the anode surface resulting in a constant and uniform resistance along that surface.

The most commonly used low index material to date has been silicon dioxide formed from silicon sputter targets and which has a refractive index of about 1.46 to about 1.48. However, the non-uniform anode problem is particularly acute for this material. Silicon is a semiconductor and must be doped usually with 0.5 to 5% boron or aluminum to form a sufficiently conductive target for DC magnetron sputtering. The unoxidized silicon material that forms on the anode exhibits a lower level of conductivity than the silicon target exhibits. This is because the crystalline structure which gives the silicon in the target its conductivity is not reproduced in the deposited films. As the film grows on the anode, the electrical resistivity increases. Any exfoliation of this built-up coating on the anode will expose a more conductive area, resulting in a locally high plasma density and sputter rate. A coating more resistive than the surface acting as the anode will be prone to electrical discharge arcing as its resistivity increases beyond a given level. The energy released by this arcing will contribute to the exfoliation process and spatter debris onto the substrate. While doped silicon is the preferred target material for depositing a low refractive index oxide, it has been discovered that it is particularly unsuitable for forming precise filters due to the difficulty imposed by the above behavior. The deposition rate may not be easily maintained within 1%, in terms of thickness, either spatially or temporally. The precise layer thickness control within 1% is also difficult to achieve with the other most commonly used sputtered coating material, titanium dioxide. These problems are overcome, however, when pairs of materials are selected within the parameters described above such that high deposition rates are achieved with suitable stability to yield multilayer dichroic coatings having satisfactory optical properties.

As indicated hereinabove, the most preferred embodiment uses an aluminum sputter target for the low refractive index material, aluminum oxide, and a zirconium metal sputter target for the high index material, zirconium oxide. In the process of fabricating the coatings of the invention, less spatter occurs by using aluminum oxide and there is a uniform deposition rate. Zirconium oxide has less absorption than other high index material. Thus, the quality, consistency and performance is enhanced by manufacturing a dichroic filter with these preferred materials.

The method of the invention results in a lower cost for manufacture since sputtering is an efficient process and aluminum sputters at high rates. Aluminum targets are also inexpensive to use. Additionally, aluminum is a preferred low index material as it results in a high yield, due to the temporal and spatial stability of the deposition rate. Compared to silicon dioxide, aluminum oxide is significantly easier to deposit using the MetaMode process. When aluminum is utilized as the target material, the cost is low while the deposition rate is high, hence adding additional pairs of high and low refractive index layers does not severely impact the cost. Aluminum oxide is also preferred as a low index material for use in dichroic filters as its refractive index is closer to that of other substances such as tantalum oxide and zirconium oxide compared to silicon oxide. Therefore, aluminum dioxide is ideally suited to reduce polarization splitting at the band edge, phase retardance at the band edge, and angle shift.

The low refractive index material can alternatively be sputtered from an alloy target. In addition, the low refractive index material can be deposited as a mixture utilizing two or more target materials and simultaneously depositing material from each target. Metal silicides, such as titanium silicide, tantalum silicide and aluminum silicide, are a preferred alternative for the low refractive index material target. Metal silicides can form mixed metal oxides and silicon oxides having a refractive index intermediate between that of the pure metal oxide (about 2.2) and silicon dioxide (1.47) depending on the particular silicide compound or alloy and the relative concentrations.

Alternatives to zirconium dioxide are silicon nitride, silicon oxynitride, niobium oxide, and titanium oxide. However, zirconium dioxide, exhibits process stability superior to that of the more commonly used titanium dioxide. Additionally, when zirconium oxide is used, the optical absorption of the resulting films is sufficiently low that a post-deposition bake is not required, as it is with titanium oxide- or niobium oxide-containing coatings. Alternative coatings include a high refractive index coating material which is a transparent conductive oxide selected from the group consisting of zinc oxide, tin oxide, indium oxide, alloys thereof, and mixtures thereof.

The coating may also comprise three or more materials such that there is an intermediate refractive index material. The intermediate refractive index material is preferably sputtered from an alloy target. Further, the coating can comprise three or more materials wherein the intermediate refractive index material is deposited as a mixture utilizing two or more target materials.

As previously indicated, the filters are particularly useful on the surface of a color splitter at high angles of incidence. Despite the problems typically encountered when light is received at a high angle of incidence, the thin film dichroic filters perform the task of separating colors with optimal transmission of each color band and with maximum contrast and brightness. An example of a coating used at a high angle of incidence is set forth in relation to FIG. 2.

Figure 2:
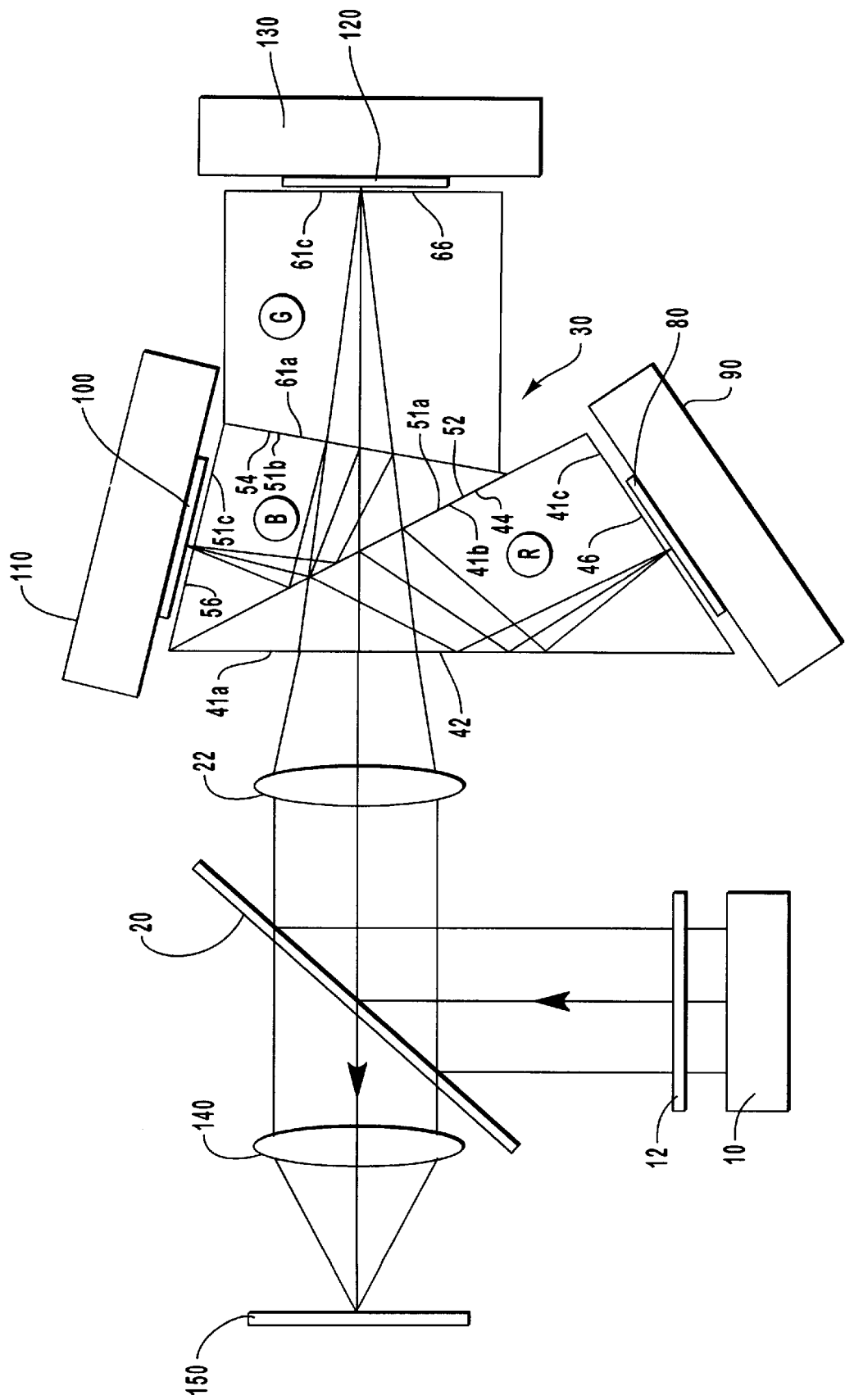
FIG. 2 is a schematic diagram of a projection display imaging system that employs the optical filter of the present invention.

FIG. 2 depicts an example of a projection display system. A nonpolarizing low shift/low splitting dichroic filter as described hereinabove is located on two surfaces of the Philips prism 30 shown in FIG. 2 at 44 and 54 located respectively on surfaces 41*b* and 51*b*. The elements of a reflective imaging system are generally described hereinbelow and are then described in greater detail with reference to FIG. 2.

Light entering a reflective imaging system passes through a polarizing device such as a polarizing beam splitter which delivers polarized light, such as S-polarized light, to a color splitter. The color splitter, such as a Philips prism, separates the polarized component of light into the three primary colors. S-polarized blue light, S-polarized green light and S-polarized red light exit the color splitter at three separate locations and are output to three reflective imagers, such as liquid crystal light valves. Each reflective imager modulates the polarization state of each of the three primary color lights and reflects the modulated light back into the color separation device in accord with a desired image such that the light is "double-passed" through the color splitter. Accordingly, if a polarized component of light, such as S-polarized light, initially enters a color splitter, the light is returned to the color splitter in the "on state" as three primary color lights which are P-polarized. The color splitter then outputs a divergent cone of P-polarized light which passes through the polarizing element and may then be directed towards a screen through a projection lens. It is also generally preferable to enhance the contrast ratio of a reflective imaging system with a waveplate compensator positioned to intercept light being transmitted from the color splitter to the reflective imager and light being reflected from the reflective imager to be inputted for the second time into the color splitter.

Although the embodiment shown in FIG. 2 is presented in the context of a reflective LCD rear projection system using a Philips prism, it will be appreciated that this is an example which is illustrative and not limiting. The system shown in FIG. 2 receives input illumination from a light source 10, which may typically be white light from a source such as a xenon, metal halide or tungsten lamp. Light source 10 is an example of a light source means for providing light. The light from light source 10 is incident in the form of a collimated beam upon a polarizing beamsplitter 20. The light preferably passes through a conventional color tuning filter or a notch filter 12 before being directed to polarizing beam splitter 20.

As shown, the collimated light reflected by polarizing beam splitter 20 passes through a convergent lens 22 which converges the light and then directs the convergent light to a Philips type of prism assembly 30. Convergent lens 22 is an example of convergent lens means for converging light. The system may also be configured with a light source which directs convergent light to polarizing beam splitter 20. In a system with a light source which directs convergent light to the beam splitter, convergent lens 22 is not needed. The technology disclosed herein may also be utilized with collimated light, although, convergent light is preferred.

Polarizing beam splitter 20 is an example of a polarizer or a polarizing means for polarizing light such that a first polarized component of light in a first polarization state is transmitted. Another example of a suitable polarizing means is a polarizing cubic beam splitter. Polarizing beam splitter 20 transmits light of one type of polarization, usually P-polarized light, while reflecting light of the other type of polarization (S-polarized in this example) into a direction 90° with respect to the direction of incidence. S-polarized light refers to light which has its polarization vector perpendicular to the plane of incidence; whereas P-polarized light refers to light which has its polarization vector lying in the plane of incidence.

The S-polarized light is reflected into Philips prism 30. The Philips prism assembly is an example of a color splitter or color splitting means for separating a first polarized component of light into three primary color lights. Other examples of color splitting means include beamsplitter cubes, cross or X-prisms, and L-prisms. The color splitting means may also be two or more flat, tilted plate dichroic mirrors and any other suitable light transmissive substrate. Since other color splitters are also suitable for achieving the separation of the incident white light into separate color channels, the Philips prism should not be construed as limiting.

Philips prism 30 comprises a first triangular prism R, a second triangular prism G and third quadrangular prism B. Each prism is preferably formed from solid glass. Philips prism 30 is configured as a conventional Philips prism to orient the red, green and blue light channels respectively through prisms R, G and B. However, the Philips prism may utilize less conventional dichroic coating configurations such that the red, green and blue light channels are not respectively directed through prisms R, G and B.

Light enters into first triangular prism R, preferably at normal incidence, through incident surface 41a. Incident surface 41a is coated with a standard type of antireflection coating 42. The incident beam travels through the prism R until it encounters splitting surface 41b, which is coated with a dichroic coating 44.

Dichroic coating 44 is an inventive nonpolarizing low shift/low splitting dichroic filter formed in accordance with the parameter described hereinabove. As previously indicated, the dichroic coatings reflect light of one predetermined wavelength or color (red, for example) while transmitting light of all other colors (green and blue, for example). If the dichroic coating 44 on reflecting surface 41b is made such that it reflects red light, then the red light will be reflected at an angle towards incident surface 41a. The red light undergoes total internal reflection at surface 41a after which it passes out of prism R through exit surface 41c, which is coated with an antireflection coating 46 on the exterior surface. A light then enters waveplate compensator 80, also known as a retarder. The dichroic coating generally has a nonzero phase retardance and a substantially constant phase retardance for the wavelength of light encountering the dichroic coating.

Second triangular prism G has an incident surface 51a, a reflecting surface 51b and an exit surface 51c. Incident surface 51a of second triangular prism G is disposed adjacent reflecting surface 41b of first triangular prism R and is air spaced from this surface.

The green and blue light transmitted through surface 41b and dichroic coating 44 passes through a small air space and then enters second triangular prism through incident surface 51a. Incident surface 51a is coated with an antireflection coating 52. A dichroic coating 54, formed in accordance with the parameters described hereinabove, is located on reflecting surface 51b for reflecting the green component of the light and for transmitting the blue component of the light. The reflected green light is then directed to 51a where it undergoes total internal reflection and then passes out of prism G through surface 51c which is coated with an anti-reflection coating 56. The light then enters into a waveplate compensator 100.

The third quadrangular prism B has an incident surface 61a and an exit surface 61c. The incident surface 61a is mounted on reflecting surface 51b of second triangular prism G so that the blue component of light transmitted through dichroic coating 54 enters third quadrangular prism B through incident surface 61a and then exits via surface 61c which is coated with an anti-reflection coating 66. The light then enters into a waveplate compensator 120.

In addition to the inventive dichroic coatings, any conventional infrared blocking coatings, anti-reflection coatings, dichroic coatings and color tuning filters coating may also be utilized with the system, such as the coatings specified hereinabove as being located on the Philips prism. Examples of suitable infrared blocking coatings, anti-reflection coatings, dichroic coatings, color tuning filters and other desirable coatings which may be utilized in the system, are set forth in detail in *Optical Thin Films User's Handbook* (1987) by James D. Rancourt which is hereby incorporated by reference or in *Design of Optical Interference Coatings* (1989) by Alfred Thelen, which is incorporated as indicated hereinabove.

As there are typically three color channels, namely red, green, and blue, there may be three separate waveplate compensators 80, 100 and 120. However, waveplate compensator 120 is generally unnecessary so there are typically only two waveplate compensators. Each waveplate compensator is in a light or optical path between the respective exit locations or exit surfaces 40c, 50c and 60c and the respective liquid crystal light valves 90, 110 and 130, such that there are three complete color channels. The waveplates may be attached or bonded directly onto either the color splitting means, such as Philips prism 30 or the reflective imager such as 90 or 110, may be free standing between the reflective imager and the color splitting prism, or may be buried in a prism component.

Each of the three colored cones of light is incident upon its respective reflective imager 90, 110 and 130 and the light from the liquid crystal light valves will be reflected back through the waveplate compensators 80, 100 and 120 and will contain the optical signal information which will form the final image for viewing upon a screen 150. Such liquid crystal light vales or reflecting type of liquid crystal panels comprise an array of pixels. When each pixel is activated, typically when a voltage or signal is applied to an individual pixel, the array of pixels reflect incident light while simultaneously rotating the polarization vector of the light by 90°. Thus the signal or image information is contained in the light which is of a particular polarization. If the liquid crystal imager is not activated, then those particular pixels of the liquid crystal imager are in the "off" state, and the light which is reflected from them will have no rotation of the polarization state. The signals from these "off" pixels should correspond to dark spots in the final image. One aspect of the quality of an image in such a system is measured through a parameter known as the contrast ratio, which is defined as the ratio of the light transmitted through the system in the on state divided by the amount of light transmitted in the "off" state. The higher the contrast ratio, the better the overall quality of the image. A display should project a bright image relative to the ambient lighting conditions. High brightness of the "on" pixels enhances the contrast ratio and allows the projector to be used in a broader range of ambient lighting conditions, i.e. a darkened room is not required.

Some of the pixels of the reflective imager or imaging liquid crystal light valves may be on and some off, in accordance with the image. Light which is reflected from the pixels which are on will have their polarization shifted by 90° by the liquid crystal light valves or LCLV, while light reflected from the pixels in the "off" state will not experience any change in polarization state due to the LCI,V. Such liquid crystal light valves are examples of reflective imagers or reflective imager means for modulating a polarization state for each of the three primary color lights and for reflecting or redirecting the red light, the green light and the blue light thus modulated back into the color splitting means.

Depolarization is often introduced during transmission due to geometrical and thin film coating effects. When transmitted by the color splitter, this portion of the light has polarization properties different than the desired polarization state and, thus, the presence of this light decreases the contrast ratio of the reflective imaging system. As previously indicated, the contrast ratio is determined by dividing the transmitted light having the selected polarization state, which corresponds to the "on" state of the liquid crystal light valve, by the amount of light transmitted which is in other state of polarization, corresponding to the "off" state. Additionally, as previously discussed, the contrast ratio of the light from a reflective imaging system is a measure of the purity of the polarization state of the transmitted light. The higher the contrast ratio, the better the overall quality of the image.

After reflected light from the pixels of each LCLV in the "off" state traverses back, the light passes through the corresponding waveplate compensators 90, 110, and 130 which are designed to effectively compensate for any rotations and ellipticity in the polarization vector. Accordingly, the contrast ratio in these liquid crystal imaging systems is enhanced by reducing the light leakage in the "off" states of the image into the "on" state.

The optical paths of "double-passing" the light in the system shown in FIG. 2 can be summarized as follows: light passes through a polarizing beam splitter 20 to polarize the light to a first polarization state and then enters the prism assembly 30. In prism 30, the polarized light undergoes color-splitting through the use of dichroic and antireflective coatings on selected surfaces. The separate colors are emitted from the prism assembly to reflective imagers 90, 110, and 130 which change the polarizing state of the reflected light in accord with a desired image. The reflected light is passed, once again, through prism assembly 30 where the separate colors are converged and the divergent light is emitted to a projection lens 140 for display of the image on a screen 150. Any conventional projection lens may be utilized. Such lenses are examples of projection lens means for projecting an image onto a screen.

The waveplate compensator may be a conventional quarter wave plate utilized to correct for the rotation introduced by a polarizing beams splitter. However, quarter wave plates are particularly inadequate in reflective imaging systems utilizing color splitters such as a Philips prism which is non-polarizing, have multiple dielectric surfaces and have a total internal reflection surface. The polarization in such complicated systems generally cannot be corrected simply with a quarter wave plate as the polarization is not simply rotated. The polarization vectors can be shifted, or rotated, off axis each time the light goes through the multiple layers of the dichroic coatings and as a result suffer from phase lags between the components of the beam as they progress through the optical media, which yield a degree of off axis components in the polarization. Accordingly, such a complicated color splitting arrangement may transmit light with a residual ellipticity and off-axis rotations of the polarization planes which yields unacceptable contrast.

These complications can be corrected through the use of waveplate compensators as disclosed in copending U.S. patent application Ser. No. 09/079,891 entitled Systems, Methods and Apparatus for Improving the Contrast Ratio in Reflective Imaging Systems Utilizing Color Splitters, filed May 15, 1998. The waveplate compensators disclosed herein are examples of waveplate compensator means for retarding at least one of the three primary color beams to achieve a predetermined phase difference.

An example of an optional notch filter such as notch filter 12 is also disclosed in U.S. patent application Ser. No. 09/079,891. Such notch filters are examples of notch filter means for tuning the wavelength ranges of the light such that the light entering the color splitter has selected wavelength ranges.

EXAMPLES OF THE PREFERRED EMBODIMENTS

Examples are provided of the present invention in order to provide specific models for obtaining coatings which have alternating layers of high and low refractive index materials which have an average refractive index no less than about 1.6 and a ratio that is in a range from about 1.05 to about 1.55 or more preferably a ratio that is greater than about 1.2 and less than about 1.55.

Examples 1–2 are hypothetical examples. Example 1 provides a method for sputtering the materials used to form a dichroic coating as set forth herein. Examples 2A–2D compare coatings outside of the specified parameters in terms of refractive index and index ratios with coatings inside the specified parameters.

Example 2A–2D provides specific designs and then provides modeling of thin film performance to identify wavelength shift and separation. The coatings described in Examples 2A–2D are designed for use on a surface such as surface 44 of prism R shown in FIG. 2.

Example 2B provides a comparative example which provides a hypothetical design for a coating outside of the specified parameters in terms of refractive index and index ratios for use on prism R at 44. Example 2C and Example 2D provide designs for coatings inside the specified parameters. Examples 2B–2D reference tables and figures which show the reflectance as a function of wavelength for the coatings described in each example. The figures clearly show the polarization split for the S and P polarization components of light which are incident at 35°, 45° and 55° for the theoretical dichroic filters designed to reflect the red wavelength band, as well as the angle shift. Example 2A summarizes the performance of the coatings described in Examples 2B–D.

Example 1

Example 1 relates to a preferred method for the sputtering of the materials comprising the optical coating. The preferred method utilizes the MetaMode® process, which allows for precisely controlled, uniform thicknesses of up to at least 75 layers. The materials are sputtered onto a glass substrate utilizing a rotary, cylindrical sputtering system which uses a separate linear magnetron to control the deposition and reaction zones. The process involves rotating the workpieces past the differentially pumped and atmospherically separated deposition and reaction zones. The separation of the deposition and reaction zones and differential pumping largely isolate the cathode deposition region from the reaction region. An ion source activates the metal-gas reaction to form the desired compound. The on source is of a magnetron type.

The following parameters apply to a coating chamber which may be utilized. The Coating chamber may have a drum diameter of 42 inches, a cathode having a height of 52 inches and width of 5 inches. The deposition rate represents the instantaneous rate in front of a cathode. Zirconium may be used at cathode 1, and an appropriate rate of deposition at 6 kW is 110 Å/sec. This deposition is preferably performed in inert argon at a flow rate of 400 sccm. The ion source operation conditions for material 1 are an applied current of about 4 amps and a flow rate of oxygen of 525 sccm. Material 2, in this example, aluminum, is placed at cathode 2, with a rate of deposition of about 90 Å/sec, in an inert flow of argon at about 400 sccm, at a power of 5 kW and an applied current of 2 amps and a flow of oxygen of 100 sccm. After the sputtering process, the entire substrate plus coating may be subjected to a post operation bake at 550° C. in air for one hour, however, this is generally not needed.

Example 2A

Example 2A compares the wavelength shift and the wavelength separation of the S and P polarization edges for a set of dichroic edge filters designed to reflect the red wavelength band. Several of the dichroic filters compared in Example 2A are described in detail in Examples 2B–D. One of the dichroic edge filters is formed from alternating layers of $TiO_2/SiO_2$ which have an index ratio that is outside the ratio utilized in the present invention. The $TiO_2/SiO_2$ combination, which is set forth in detail in Example 2B, is used as a comparative example to the other coatings. Another dichroic edge filter is formed from alternating layers of $ZrO_2/SiO_2$. The other dichroic edge filters have indices and index ratios within the parameters disclosed as providing the optimal properties, two of which are described in detail in Examples 2C and 2D. The filters described in Examples 2C and 2D are the following combinations $ZrO_2/Al_2O_3$ and $TiO_2/TiO_2$ mix. The design of each filter is adjusted to have identical edge slopes and S plane reflectance values.

Modeling of thin film performance identifies the amount by which the wavelength of 50% S plane transmission shifts when viewing the design first at 35° and then at 55°. This is referred to in Table 1 as the wavelength (λ) shift. Modeling of thin film performance also identifies the difference in 50% S plane and 50% P plane transmission wavelengths when viewing the design at 45°. This is referred to in Table 1 as the wavelength (λ) separation of the S and P edges. Low wavelength shift and wavelength separation values indicate that the filter performs well in these areas. In determining the refractive index values, it is assumed that the coatings are applied by a MetaMode® process.

TABLE 1

| Materials (H/L) | $n_H$ | $n_L$ | Ratio $n_H/n_L$ | Index Avg | # of Layers | Total Thickness | λ Shift | λ Separation |
|---|---|---|---|---|---|---|---|---|
| $TiO_2/SiO_2$ | 2.44 | 1.48 | 1.65 | 1.96 | 24 | 2.56 μm | 37 nm | 18 nm |
| $ZrO_2/SiO_2$ | 2.2 | 1.48 | 1.49 | 1.84 | 29 | 3.02 μm | 39 nm | 16 nm |
| $TiO_2/Al_2O_3$ | 2.44 | 1.66 | 1.47 | 2.05 | 31 | 2.81 μm | 37 nm | 16 nm |
| $ZrO_2/Al_2O_3$ | 2.2 | 1.66 | 1.33 | 1.93 | 37 | 3.41 μm | 39 nm | 10 nm |
| $TiO_2$/ $TiO_2$ mix | 2.44 | 1.9 | 1.29 | 2.17 | 43 | 3.41 μm | 28 nm | 9 nm |

The mix used in the $TiO_2/TiO_2$ mix is a composite material of titanium and aluminum oxides with a refractive index of 1.90. The mix provides the optimum index ratio and highest average index when used with $TiO_2$. The optimum ratio is the lowest ratio which still gives a P plane reflectance which covers the red wavelength band using one quarter-wave stack. Accordingly, the optimum ratio is a balance between the desired low polarization splitting and the number of layers required to achieve the desired reflectance.

The $TiO_2/TiO_2$ mix filter has the lowest wavelength shift due primarily to its having the highest index average. The $TiO_2/TiO_2$ mix filter also has the lowest wavelength separation as it has the lowest due primarily to its index ratio being lower than the other filters. IHowever, the $TiO_2/TiO_2$ mix filter also requires the highest number of layers, 43, which is approaching an unacceptable amount. The $ZrO_2/Al_2O_3$ filter has an acceptable wavelength shift and the next lowest wavelength separation. The $TiO_2/Al_2O_3$ filter performs slightly better in terms of wavelength shift than the $ZrO_2/Al_2O_3$ filter, however, $TiO_2/Al_2O_3$ filter has a higher wavelength separation. All of the filters having an index ratio within the acceptable range of parameters generally perform better than the conventional $TiO_2/SiO_2$ filter. More specifically, all of the filters within the acceptable range of parameters have a wavelength separation that is lower than the conventional $TiO_2/SiO_2$ filter while having a wavelength shift that is about as good or better than that of the $TiO_2/SiO_2$ filter.

Example 2B

Example 2B provides a theoretical comparative example of a dichroic filter designed to reflect the red wavelength band. The filter is formed from alternating layers of $TiO_2$ and $SiO_2$ which is a typical material combination as indicated in Example 2A.

The order of the layers, the index of each layer and the thickness of each layer are set forth in Table 2 provided hereinbelow. Layer 1 is applied to a glass substrate.

TABLE 2

| Layer | Material | Index | Thickness (nm) |
|---|---|---|---|
| 1 | $TiO_2$ | 2.48 | 104.04 |
| 2 | $SiO_2$ | 1.482 | 32.90 |
| 3 | $TiO_2$ | 2.48 | 116.89 |
| 4 | $SiO_2$ | 1.482 | 39.47 |
| 5 | $TiO_2$ | 2.48 | 113.01 |

TABLE 2-continued

| Layer | Material | Index | Thickness (nm) |
|---|---|---|---|
| 6 | $SiO_2$ | 1.482 | 47.34 |
| 7 | $TiO_2$ | 2.48 | 97.24 |
| 8 | $SiO_2$ | 1.482 | 118.48 |
| 9 | $TiO_2$ | 2.48 | 85.40 |
| 10 | $SiO_2$ | 1.482 | 103.61 |
| 11 | $TiO_2$ | 2.48 | 85.89 |
| 12 | $SiO_2$ | 1.482 | 109.69 |
| 13 | $TiO_2$ | 2.48 | 82.95 |
| 14 | $SiO_2$ | 1.482 | 119.98 |
| 15 | $TiO_2$ | 2.48 | 79.28 |
| 16 | $SiO_2$ | 1.482 | 129.82 |
| 17 | $TiO_2$ | 2.48 | 76.38 |
| 18 | $SiO_2$ | 1.482 | 139.16 |
| 19 | $TiO_2$ | 2.48 | 76.05 |
| 20 | $SiO_2$ | 1.482 | 147.68 |
| 21 | $TiO_2$ | 2.48 | 80.30 |
| 22 | $SiO_2$ | 1.482 | 160.76 |
| 23 | $TiO_2$ | 2.48 | 87.53 |
| 24 | $SiO_2$ | 1.482 | 87.15 |
| Air | | | |

Modeling of thin film performance provides the reflectance as a function of wavelength of the S and the P plane of polarization at 35°, 45°, and 55° angles of incidence. The values for the reflectances for the filter are provided in Table 3 and in FIGS. 3 and 4. Table 3 provides the reflectance values based on wavelengths varied in increments of ten nanometers while FIGS. 3 and 4 are depicted based on wavelength increments of two nanometers.

Figure 3:
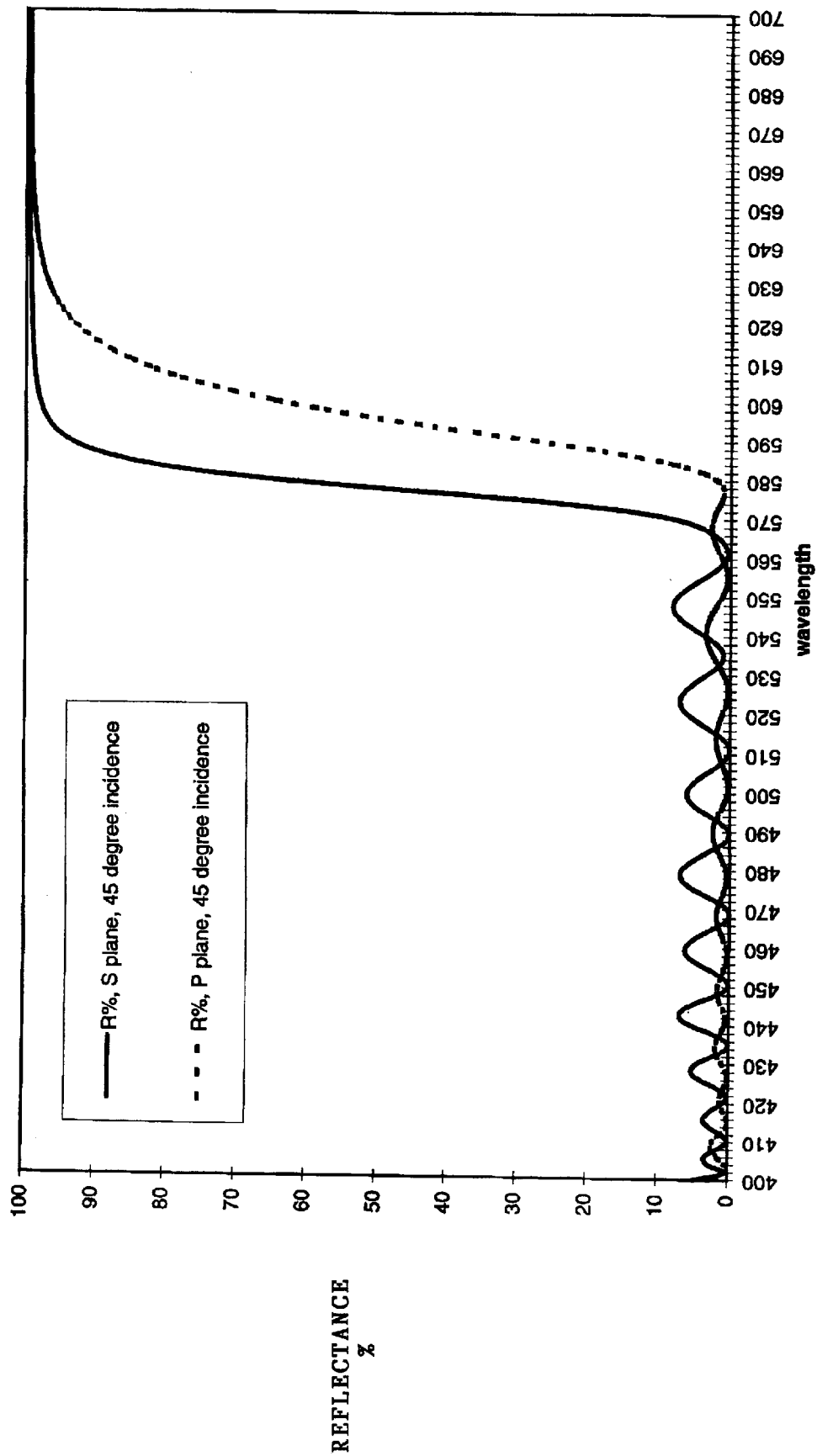
FIG. 3 is a graph plotting reflectance as a function of wavelength to show the polarization split for the S and P polarization components of light which are incident at 45° to a theoretical $TiO_2/SiO_2$ dichroic filter designed to reflect the red wavelength band.

FIG. 3 depicts the reflection of S and P plane polarization at a 45° angle of incidence, which is the nominal angle. More particularly, FIG. 3, plots reflectance as a function of wavelength, to show the polarization split for the S and P polarization components of light which are incident at 45° to the theoretical dichroic filter.

Figure 4:
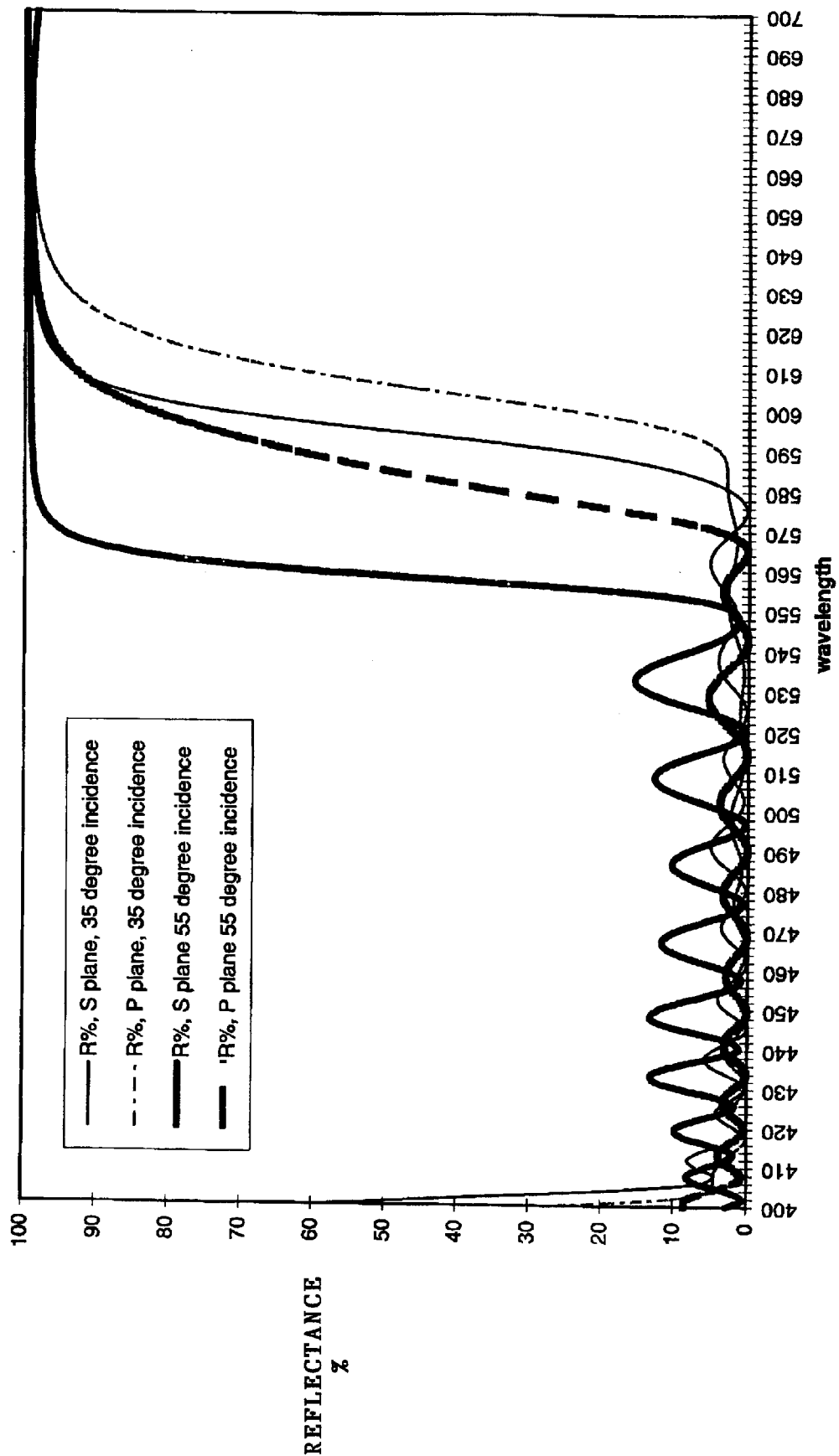
FIG. 4 is a graph plotting reflectance as a function of wavelength to show the polarization split and angle shift for the S and P polarization components of light which are incident at 35° and 55° to a theoretical $TiO_2/SiO_2$ dichroic filter.

FIG. 4 depicts the polarization split for the S and P polarization components of light which are incident at 35° and 55° to the theoretical dichroic filter. More particularly, FIG. 4 plots reflectance as a function of wavelength for the theoretical dichroic filter. The graph also shows the angle shift for these extreme angles.

TABLE 3

| λ nm | Reflect. of S-plane at 35° | Reflect. of P-plane at 35° | Reflect. of S-plane at 45° | Reflect. of P-plane at 45° | Reflect. of S-plane at 55° | Reflect. of P-plane at 55° |
|---|---|---|---|---|---|---|
| 400 | 58.88 | 26.3884 | 4.7704 | 2.4057 | 2.7717 | 8.5585 |
| 410 | 6.7752 | 4.0979 | 0.064 | 2.1323 | 5.885 | 1.9127 |
| 420 | 1.3117 | 0.2869 | 0.8407 | 1.114 | 9.8522 | 0.2737 |
| 430 | 0.2677 | 0.2196 | 4.5198 | 0.7728 | 8.9345 | 1.9512 |
| 440 | 4.7319 | 3.0454 | 5.0803 | 0.6424 | 1.2495 | 2.8913 |
| 450 | 2.8691 | 0.4817 | 0.1268 | 1.572 | 12.3662 | 0.0332 |
| 460 | 0.5294 | 1.1453 | 6.1511 | 0.3343 | 2.5742 | 2.8948 |
| 470 | 3.4052 | 0.8247 | 0.2228 | 1.6627 | 9.7378 | 0.088 |
| 480 | 0.2777 | 1.5479 | 6.7918 | 0.4715 | 2.8791 | 3.377 |
| 490 | 4.8775 | 1.1648 | 0.0804 | 2.3282 | 8.3491 | 0.028 |
| 500 | 1.097 | 2.3405 | 5.984 | 0.3544 | 2.7376 | 3.5596 |
| 510 | 2.7172 | 0.6619 | 0.1708 | 1.5112 | 12.3385 | 1.2087 |
| 520 | 1.4373 | 1.0089 | 5.818 | 1.13 | 0.2867 | 1.783 |
| 530 | 1.4889 | 0.805 | 3.4679 | 0.7788 | 13.9548 | 5.3135 |
| 540 | 3.9288 | 0.993 | 3.2916 | 3.344 | 8.1725 | 0.5877 |
| 550 | 1.6353 | 2.758 | 7.4997 | 1.2592 | 2.027 | 2.2786 |
| 560 | 5.008 | 2.2686 | 0.5673 | 1.0683 | 63.3032 | 2.1086 |
| 570 | 2.3027 | 1.7141 | 7.4612 | 2.4681 | 95.4663 | 3.5223 |
| 580 | 2.1111 | 2.9174 | 67.5933 | 1.7137 | 98.4972 | 33.7959 |
| 590 | 24.6358 | 3.8262 | 94.4454 | 27.3433 | 98.9914 | 63.6262 |
| 600 | 75.023 | 23.798 | 98.098 | 65.0919 | 99.1222 | 83.706 |
| 610 | 93.8698 | 63.046 | 98.8735 | 85.2145 | 99.2118 | 93.4222 |
| 620 | 97.7079 | 85.5901 | 99.1472 | 93.7011 | 99.3057 | 96.9459 |
| 630 | 98.7311 | 94.0014 | 99.2949 | 96.9677 | 99.4053 | 98.2431 |
| 640 | 99.1193 | 97.0848 | 99.4022 | 98.2689 | 99.4983 | 98.7845 |
| 650 | 99.318 | 98.3305 | 99.4899 | 98.8449 | 99.5772 | 99.028 |
| 660 | 99.4429 | 98.8985 | 99.5619 | 99.1273 | 99.6401 | 99.1273 |
| 670 | 99.5312 | 99.1896 | 99.6203 | 99.2734 | 99.6893 | 99.129 |
| 680 | 99.5969 | 99.3509 | 99.6668 | 99.3432 | 99.7271 | 99.0306 |
| 690 | 99.6466 | 99.4431 | 99.7031 | 99.358 | 99.7558 | 98.7811 |
| 700 | 99.684 | 99.4924 | 99.7309 | 99.3175 | 99.7771 | 98.2422 |

Example 2C

Example 2C is theoretical example of a dichroic filter designed to reflect the red wavelength band. The filter is formed from alternating layers of $ZrO_2$ and $Al_2O_3$, which is a preferred combination, as indicated in Example 2A.

The order of the layers, the index of each layer and the thickness of each layer are set forth in Table 4 provided hereinbelow. Layer 1 is applied to a glass substrate.

TABLE 4

| Layer | Material | Index | Thickness (nm) |
|---|---|---|---|
| 1 | $Al_2O_3$ | 1.66 | 73.24 |
| 2 | $ZrO_2$ | 2.2 | 98.26 |
| 3 | $Al_2O_3$ | 1.66 | 132.54 |
| 4 | $ZrO_2$ | 2.2 | 97.15 |
| 5 | $Al_2O_3$ | 1.66 | 139.07 |
| 6 | $ZrO_2$ | 2.2 | 97.02 |
| 7 | $Al_2O_3$ | 1.66 | 118.42 |
| 8 | $ZrO_2$ | 2.2 | 91.91 |
| 9 | $Al_2O_3$ | 1.66 | 96.03 |
| 10 | $ZrO_2$ | 2.2 | 99.46 |
| 11 | $Al_2O_3$ | 1.66 | 70.38 |
| 12 | $ZrO_2$ | 2.2 | 101.40 |
| 13 | $Al_2O_3$ | 1.66 | 79.18 |
| 14 | $ZrO_2$ | 2.2 | 98.93 |
| 15 | $Al_2O_3$ | 1.66 | 70.60 |
| 16 | $ZrO_2$ | 2.2 | 102.74 |
| 17 | $Al_2O_3$ | 1.66 | 70.60 |
| 18 | $ZrO_2$ | 2.2 | 102.74 |

TABLE 4-continued

| Layer | Material | Index | Thickness (nm) |
|---|---|---|---|
| 19 | $Al_2O_3$ | 1.66 | 70.60 |
| 20 | $ZrO_2$ | 2.2 | 102.74 |
| 21 | $Al_2O_3$ | 1.66 | 70.60 |
| 22 | $ZrO_2$ | 2.2 | 102.74 |
| 23 | $Al_2O_3$ | 1.66 | 70.60 |
| 24 | $ZrO_2$ | 2.2 | 102.74 |
| 25 | $Al_2O_3$ | 1.66 | 70.60 |
| 26 | $ZrO_2$ | 2.2 | 102.74 |
| 27 | $Al_2O_3$ | 1.66 | 67.31 |
| 28 | $ZrO_2$ | 2.2 | 110.49 |
| 29 | $Al_2O_3$ | 1.66 | 54.48 |
| 30 | $ZrO_2$ | 2.2 | 118.43 |
| 31 | $Al_2O_3$ | 1.66 | 36.28 |
| 32 | $ZrO_2$ | 2.2 | 123.75 |
| 33 | $Al_2O_3$ | 1.66 | 30.93 |
| 34 | $ZrO_2$ | 2.2 | 134.47 |
| 35 | $Al_2O_3$ | 1.66 | 24.04 |
| 36 | $ZrO_2$ | 2.2 | 64.46 |
| 37 | $Al_2O_3$ | 1.66 | 78.30 |
| Air | | | |

Modeling of thin film performance provides the reflectance as a function of wavelength of the S and the P plane of polarization at 35°, 45°, and 55° angles of incidence. The values for the reflectances for the filter are provided in Table 5 and in FIGS. 5 and 6. Table 5 provides the reflectance values based on wavelengths varied in increments of ten nanometers while FIGS. 5 and 6 are depicted based on wavelength increments of two nanometers.

Figure 5:
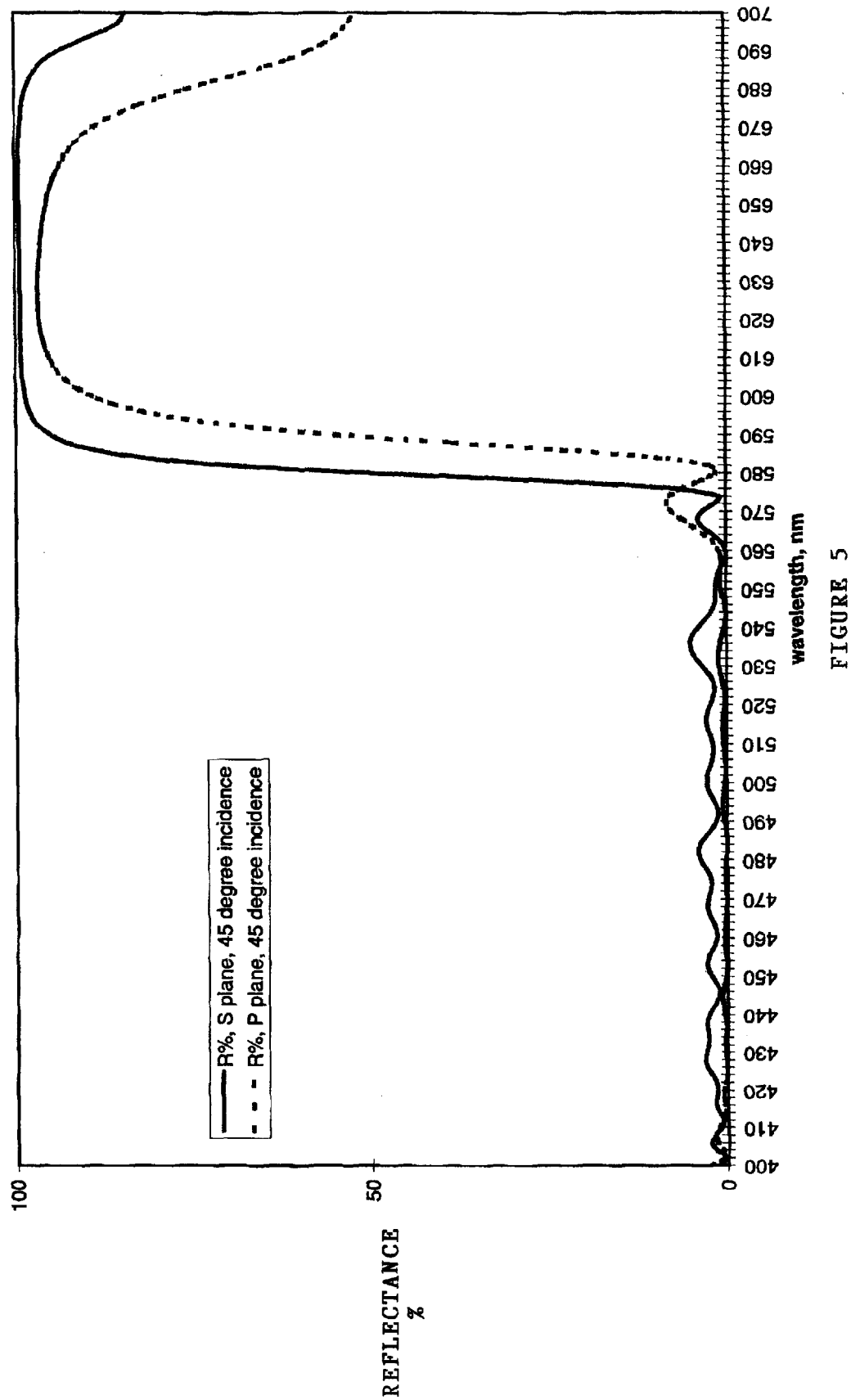
FIG. 5 is a graph plotting reflectance as a function of wavelength to show the polarization split for the S and P polarization components of light which are incident at 45° to a theoretical $ZrO_2/Al_2O_3$ dichroic filter designed to reflect the red wavelength band.

FIG. 5 depicts the reflection of S and P plane polarization at a 45° angle of incidence, which is the nominal angle. More particularly, FIG. 5, plots reflectance as a function of wavelength, to show the polarization split for the S and P polarization components of light which are incident at 45° to the theoretical dichroic filter.

Figure 6:
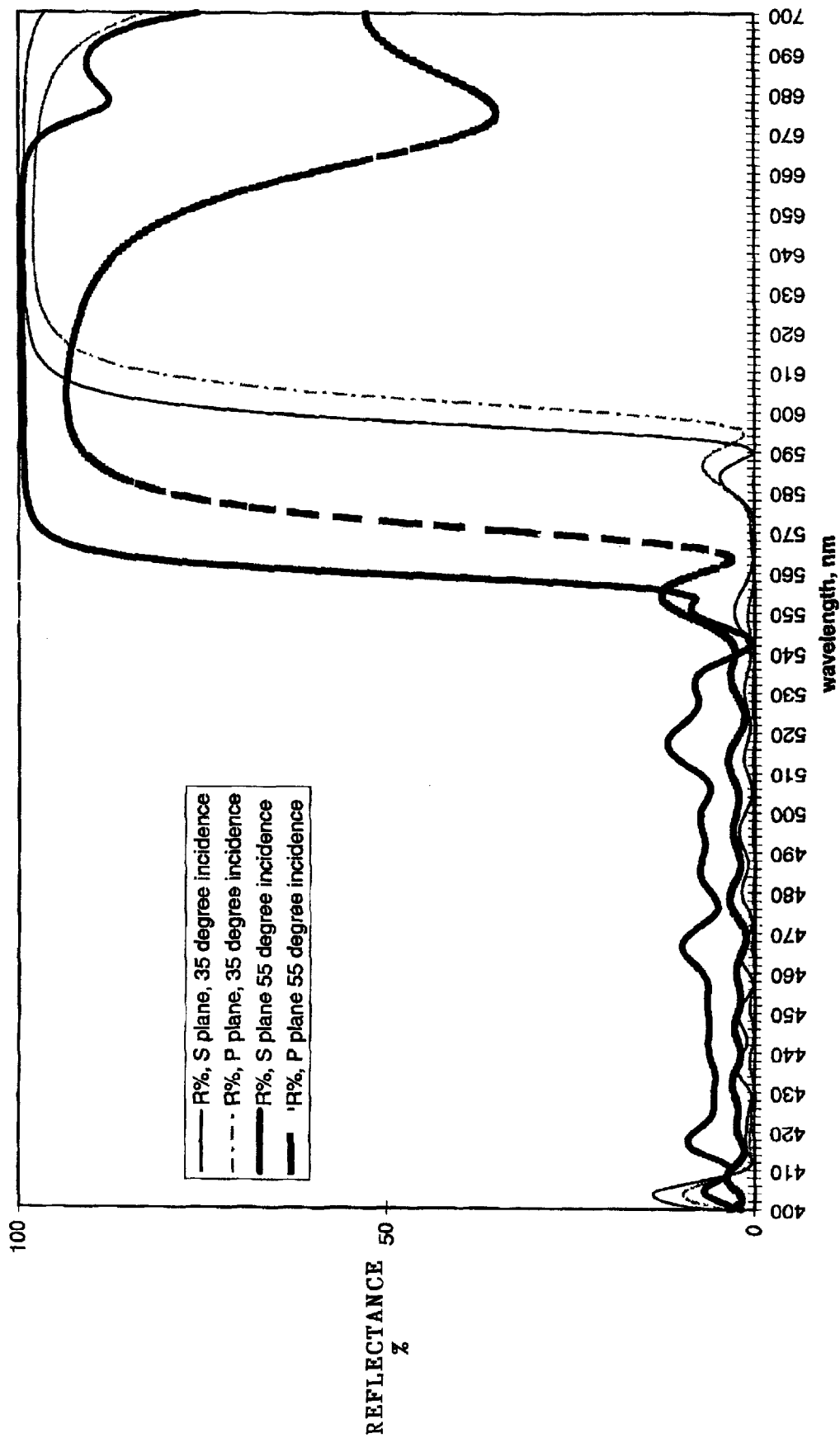
FIG. 6 is a graph plotting reflectance as a function of wavelength to show the polarization split and angle shift for the S and P polarization components of light which are incident at 35° and 55° to a theoretical $ZrO_2/Al_2O_3$ dichroic filter.

FIG. 6 depicts the polarization split for the S and P polarization components of light which are incident at 35° and 55° to the theoretical dichroic filter. More particularly, FIG. 6 plots reflectance as a function of wavelength for the theoretical dichroic filter . The graph also shows the angle shift for these extreme angles.

TABLE 5

| λ nm | Reflect. of S-plane at 35° | Reflect. of P-plane at 35° | Reflect. of S-plane at 45° | Reflect. of P-plane at 45° | Reflect. of S-plane at 55° | Reflect. of P-plane at 55° |
|---|---|---|---|---|---|---|
| 400 | 6.6751 | 4.239 | 1.1788 | 2.2415 | 1.7167 | 3.1779 |
| 410 | 1.4998 | 1.5913 | 0.821 | 1.1948 | 3.1127 | 3.3013 |
| 420 | 1.0223 | 0.4685 | 1.3605 | 0.4659 | 8.0241 | 2.2061 |
| 430 | 0.4751 | 0.0255 | 2.9343 | 0.2901 | 5.4549 | 2.7418 |
| 440 | 1.6481 | 0.5192 | 2.5447 | 0.3691 | 6.1667 | 1.8604 |
| 450 | 2.2253 | 0.5814 | 2.1648 | 0.1636 | 6.3148 | 2.3345 |
| 460 | 0.7516 | 0.0495 | 1.4148 | 0.4274 | 6.9805 | 2.4802 |
| 470 | 0.7045 | 0.1981 | 2.6088 | 0.0372 | 8.6953 | 1.1643 |
| 480 | 1.7363 | 0.202 | 3.6514 | 0.1416 | 5.7906 | 3.285 |
| 490 | 1.2207 | 0.0615 | 1.4525 | 0.3546 | 6.7898 | 2.1256 |
| 500 | 1.2517 | 0.1697 | 2.7805 | 0.2689 | 7.2207 | 2.4353 |
| 510 | 1.0106 | 0.1916 | 1.9435 | 0.4573 | 7.4991 | 3.169 |
| 520 | 0.7058 | 0.0054 | 2.2907 | 0.2429 | 11.1171 | 2.0301 |
| 530 | 1.3755 | 0.3027 | 3.2776 | 1.0119 | 7.7909 | 2.5275 |
| 540 | 0.518 | 0.1144 | 3.9171 | 0.2718 | 2.0627 | 2.619 |
| 550 | 2.6417 | 0.853 | 1.4329 | 0.6727 | 8.3186 | 9.7839 |
| 560 | 0.5227 | 0.0077 | 0.0466 | 0.9784 | 58.1772 | 7.1444 |
| 570 | 0.0496 | 0.459 | 3.3407 | 7.4932 | 96.9472 | 32.2378 |

TABLE 5-continued

| λ nm | Reflect. of S-plane at 35° | Reflect. of P-plane at 35° | Reflect. of S-plane at 45° | Reflect. of P-plane at 45° | Reflect. of S-plane at 55° | Reflect. of P-plane at 55° |
|---|---|---|---|---|---|---|
| 580 | 2.937 | 3.1222 | 49.3234 | 1.4559 | 99.0724 | 81.2972 |
| 590 | 0.1147 | 5.4997 | 95.1187 | 54.4111 | 99.3393 | 91.4848 |
| 600 | 71.3291 | 22.031 | 98.6743 | 89.2751 | 99.3628 | 93.4891 |
| 610 | 95.8262 | 83.7755 | 99.2117 | 95.2889 | 99.3975 | 93.3455 |
| 620 | 98.5688 | 95.2685 | 99.3155 | 96.6553 | 99.5113 | 92.2707 |
| 630 | 99.1079 | 97.493 | 99.3322 | 96.8079 | 99.6296 | 90.3247 |
| 640 | 99.2239 | 98.015 | 99.382 | 96.4635 | 99.6868 | 86.3538 |
| 650 | 99.2281 | 98.0138 | 99.4591 | 95.7049 | 99.6404 | 77.6094 |
| 660 | 99.2306 | 97.7776 | 99.4752 | 93.9103 | 99.2497 | 60.0212 |
| 670 | 99.2301 | 97.3046 | 99.3059 | 88.9598 | 99.5902 | 38.6749 |
| 680 | 99.1084 | 96.1514 | 98.475 | 75.8498 | 88.2346 | 37.2251 |
| 690 | 98.5769 | 92.7751 | 93.8723 | 58.364 | 90.3151 | 47.9888 |
| 700 | 96.4357 | 82.5289 | 84.3892 | 51.8877 | 75.5514 | 52.7187 |

Example 2D

Example 2D is theoretical example of a dichroic filter designed to reflect the red wavelength band. The filter is formed from alternating layers of $TiO_2$ and $TiO_2/TiO_2$ mix as set forth in Example 2A. The $TiO_2$ mix is a mixture of titanium and aluminum oxides with a refractive index of 1.90. The mix film can be obtained by an iterative process of changing the power to both the titanium and aluminum targets, to increase or decrease their relative deposition rates, and measuring the refractive index of each film so obtained. The combination of alternating layers of $TiO_2$ and $TiO_2$ mix is a preferred combination. However, since it is less complicated to use a single material instead of a mixture such as the $TiO_2$ mix, the $ZrO_2/Al_2O_3$ combination is more preferred.

The order of the layers, the index of each layer and the thickness of each layer are set forth in Table 6 provided hereinbelow. Layer 1 is applied to a glass substrate.

TABLE 6

| Layer | Material | Index | Thickness (nm) |
|---|---|---|---|
| 1 | mix | 1.9 | 54.91 |
| 2 | $TiO_2$ | 2.48 | 65.69 |
| 3 | mix | 1.9 | 111.26 |
| 4 | $TiO_2$ | 2.48 | 59.62 |
| 5 | mix | 1.9 | 114.72 |
| 6 | $TiO_2$ | 2.48 | 50.72 |
| 7 | mix | 1.9 | 115.09 |
| 8 | $TiO_2$ | 2.48 | 53.30 |
| 9 | mix | 1.9 | 106.69 |
| 10 | $TiO_2$ | 2.48 | 61.52 |
| 11 | mix | 1.9 | 96.93 |
| 12 | $TiO_2$ | 2.48 | 67.52 |
| 13 | mix | 1.9 | 91.01 |
| 14 | $TiO_2$ | 2.48 | 67.52 |
| 15 | mix | 1.9 | 91.01 |
| 16 | $TiO_2$ | 2.48 | 67.52 |
| 17 | mix | 1.9 | 91.01 |
| 18 | $TiO_2$ | 2.48 | 67.52 |
| 19 | mix | 1.9 | 91.01 |
| 20 | $TiO_2$ | 2.48 | 67.52 |
| 21 | mix | 1.9 | 91.01 |
| 22 | $TiO_2$ | 2.48 | 67.52 |
| 23 | mix | 1.9 | 91.01 |
| 24 | $TiO_2$ | 2.48 | 67.52 |
| 25 | mix | 1.9 | 91.01 |
| 26 | $TiO_2$ | 2.48 | 67.52 |
| 27 | mix | 1.9 | 91.01 |
| 28 | $TiO_2$ | 2.48 | 67.52 |
| 29 | mix | 1.9 | 91.01 |
| 30 | $TiO_2$ | 2.48 | 67.23 |
| 31 | mix | 1.9 | 89.91 |
| 32 | $TiO_2$ | 2.48 | 67.44 |
| 33 | mix | 1.9 | 93.06 |
| 34 | $TiO_2$ | 2.48 | 63.74 |
| 35 | mix | 1.9 | 97.64 |
| 36 | $TiO_2$ | 2.48 | 63.16 |
| 37 | mix | 1.9 | 94.28 |
| 38 | $TiO_2$ | 2.48 | 69.86 |
| 39 | mix | 1.9 | 86.86 |
| 40 | $TiO_2$ | 2.48 | 72.62 |
| 41 | mix | 1.9 | 96.50 |
| 42 | $TiO_2$ | 2.48 | 38.87 |
| 43 | mix | 1.9 | 63.06 |
| Air | | | |

Modeling of thin film performance provides the reflectance as a function of wavelength of the S and the P plane of polarization at 35°, 45°, and 55° angles of incidence. The values for the reflectances for the filter are provided in Table 7 and in FIGS. 7 and 8. Table 7 provides the reflectance values based on wavelengths varied in increments of ten nanometers while FIGS. 7 and 8 are depicted based on wavelength increments of two nanometrs.

Figure 7:
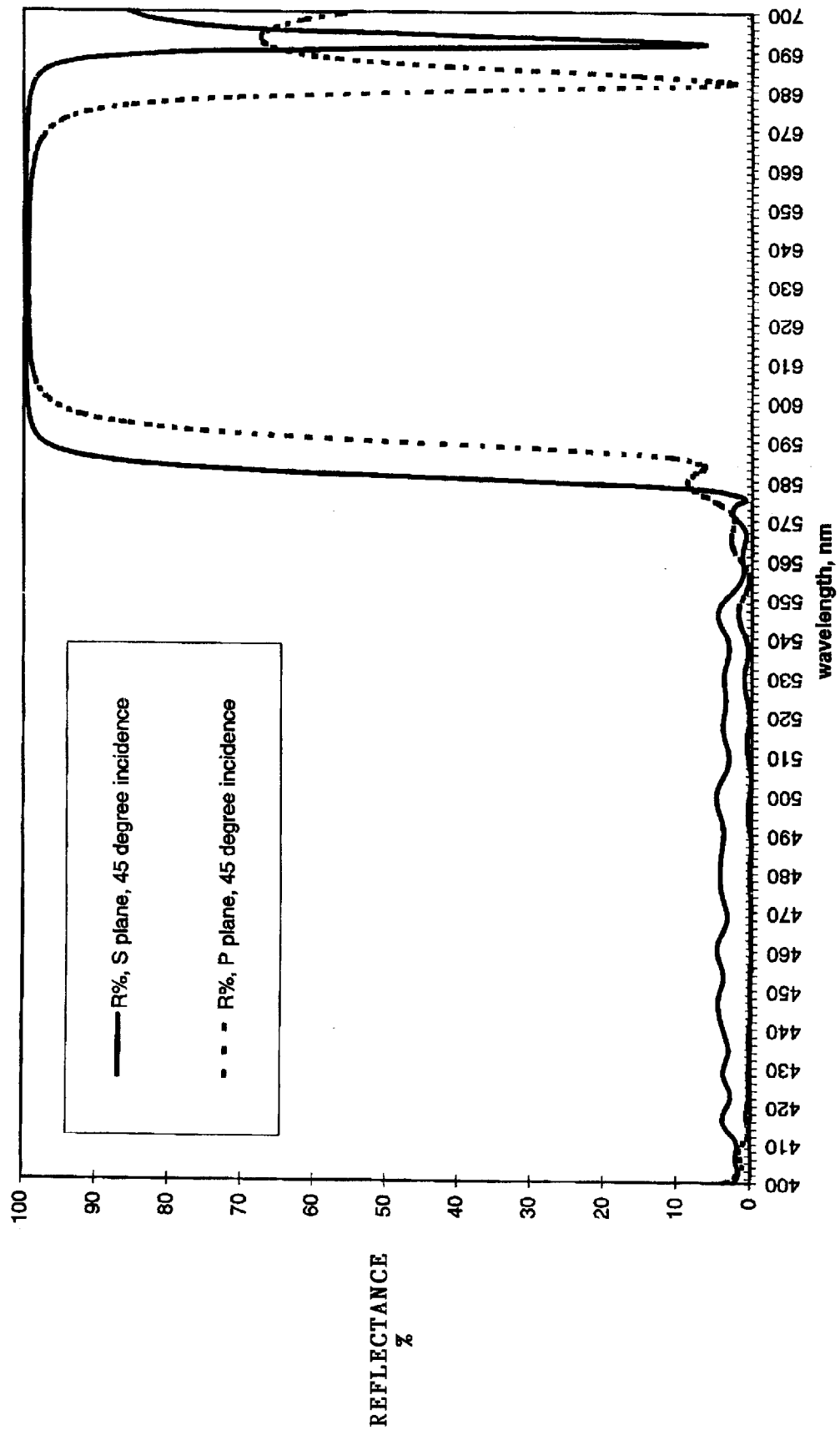
FIG. 7 is a graph plotting reflectance as a function of wavelength to show the polarization split for the S and P polarization components of light which are incident at 45° to a theoretical $TiO_2/TiO_2$ mix dichroic filter designed to reflect the red wavelength band.

FIG. 7 depicts the reflection of S and P planes of polarization at a 45° angle of incidence, which is the nominal angle. More particularly, FIG. 7, plots reflectance as a funtion of wavelength, to show the polarization split for the S and P polarization components of light which are incident at 45° to the theoretical dichroic filter.

Figure 8:
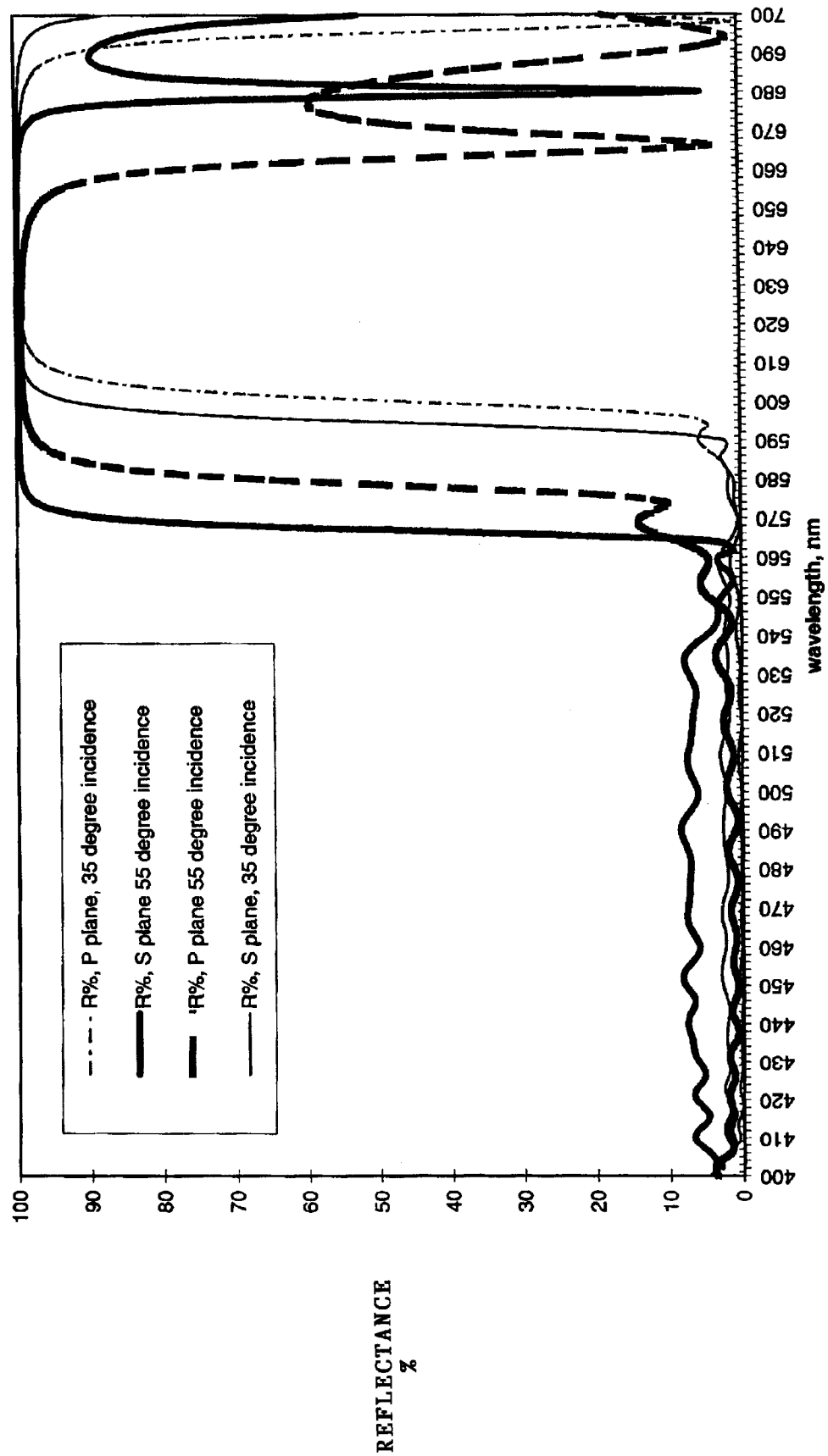
FIG. 8 is a graph plotting reflectance as a function of wavelength to show the polarization split and angle shift for the S and P polarization components of light which are incident at 35° and 55° to a theoretical $TiO_2/TiO_2$ mix dichroic filter.

FIG. 8 depicts the polarization split for the S and P polarization components of light which are incident at 35° and 55° to the theoretical dichroic filter. More particularly, FIG. 8 plots reflectance as a function of wavelength for the theoretical dichroic filter. The graph also shows the angle shift for these extreme angles.

TABLE 7

| λ nm | Reflect. of S-plane at 35° | Reflect. of P-plane at 35° | Reflect. of S-plane at 45° | Reflect. of P-plane at 45° | Reflect. of S-plane at 55° | Reflect. of P-plane at 55° |
|---|---|---|---|---|---|---|
| 400 | 4.7995 | 4.4256 | 2.1764 | 3.3526 | 3.6474 | 3.5697 |
| 410 | 1.2039 | 0.4663 | 1.758 | 1.0615 | 6.676 | 1.8973 |
| 420 | 2.0054 | 0.1435 | 3.1289 | 0.4799 | 6.4609 | 1.8615 |
| 430 | 1.8786 | 0.1858 | 3.5937 | 0.1974 | 6.0912 | 1.7978 |
| 440 | 2.1419 | 0.1961 | 3.714 | 0.1749 | 7.5652 | 0.9327 |
| 450 | 2.7632 | 0.2565 | 4.1298 | 0.1042 | 7.8704 | 0.6398 |
| 460 | 2.3536 | 0.0847 | 4.6043 | 0.0083 | 5.9258 | 1.0457 |
| 470 | 2.8819 | 0.2286 | 3.2719 | 0.0452 | 7.4904 | 1.6319 |
| 480 | 2.0868 | 0.1473 | 4.2028 | 0.236 | 7.1044 | 1.1564 |
| 490 | 2.6679 | 0.3027 | 3.776 | 0.1055 | 8.3843 | 0.9166 |
| 500 | 2.2269 | 0.0852 | 4.7404 | 0.2386 | 6.0944 | 2.1182 |
| 510 | 2.9594 | 0.5009 | 3.0524 | 0.4663 | 7.3485 | 1.2022 |
| 520 | 1.6558 | 0.1478 | 3.6948 | 0.2687 | 6.5954 | 2.3173 |
| 530 | 2.0153 | 0.2493 | 3.7055 | 0.9858 | 7.191 | 2.4701 |
| 540 | 2.2915 | 0.7218 | 3.259 | 0.7223 | 4.7877 | 2.0624 |
| 550 | 1.5568 | 0.3128 | 3.5849 | 1.3424 | 2.6396 | 4.5714 |
| 560 | 2.9309 | 1.4115 | 1.252 | 1.4294 | 3.0733 | 4.4921 |
| 570 | 0.4279 | 0.3101 | 1.7835 | 2.3567 | 87.268 | 13.6883 |
| 580 | 0.9249 | 1.611 | 33.0506 | 8.7474 | 99.2558 | 66.263 |
| 590 | 2.1098 | 5.6468 | 97.8773 | 55.0176 | 99.6507 | 97.1495 |
| 600 | 92.0305 | 45.7331 | 99.4858 | 96.755 | 99.722 | 98.9589 |

TABLE 7-continued

| λ nm | Reflect. of S-plane at 35° | Reflect. of P-plane at 35° | Reflect. of S-plane at 45° | Reflect. of P-plane at 45° | Reflect. of S-plane at 55° | Reflect. of P-plane at 55° |
|---|---|---|---|---|---|---|
| 610 | 99.1238 | 96.3405 | 99.6573 | 99.031 | 99.7507 | 99.2187 |
| 620 | 99.5757 | 99.0848 | 99.7042 | 99.3468 | 99.7606 | 99.2279 |
| 630 | 99.6625 | 99.433 | 99.7196 | 99.4018 | 99.7579 | 99.1065 |
| 640 | 99.6877 | 99.5057 | 99.7182 | 99.3659 | 99.7408 | 98.7348 |
| 650 | 99.6891 | 99.5019 | 99.7 | 99.2253 | 99.6972 | 97.1809 |
| 660 | 99.6719 | 99.4421 | 99.6544 | 98.785 | 99.5733 | 80.0756 |
| 670 | 99.6248 | 99.2661 | 99.5272 | 96.3386 | 98.8181 | 34.1355 |
| 680 | 99.4964 | 98.6045 | 98.8881 | 38.5164 | 5.2117 | 56.9663 |
| 690 | 98.9322 | 92.5351 | 71.3667 | 63.8517 | 89.4391 | 12.9996 |
| 700 | 87.7084 | 23.5262 | 85.6729 | 54.615 | 52.3775 | 18.3054 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within heir scope.

What is claimed and desired to be secured by United States Letters Patent is:

1. A color separating optical coating for separating visible wavelengths at high angles of incidence on a surface of a color splitting means for separating light into different colors, the coating comprising:
   alternating layers of at least two different dielectric materials,
   the at least two different dielectric materials including a low refractive index material and a high refractive index material, the low refractive index material having a lower index of refraction than the index of refraction of the high refractive index material,
   the index of refraction of the low refractive index material and the index of refraction of the high refractive index material having an average refractive index which is no less than about 1.6,
   the index of refraction of the high refractive index material divided by the index of refraction of the low refractive index material yielding a ratio in a range from about 1.05 to about 1.55, whereby visible light encountering the coating at high angles of incidence is split into separate colors.

2. A coating as recited in claim 1, wherein said high and low refractive index materials are deposited by a sputtering process.

3. A coating as recited in claim 1, wherein said low refractive index material is aluminum oxide.

4. A coating as recited in claim 1, wherein said low refractive index material is a material selected from the group consisting of $In_2O_3$, SiO, $Si_2O_3$, silicon oxynitride, $SnO_2$, ZnO, $Ta_2O_5$, $ZrO_2$, oxides and nitrides of metal silicides, and mixtures thereof.

5. A coating as recited in claim 1, wherein said low refractive index material is selected from the group consisting of $MgF_2$, $Na_3AlF_6$, $SiO_2$, oxides and nitrides of metal suicides, and mixtures thereof.

6. A coating as recited in claim 1, wherein said low refractive index material is a mixture of at least two materials.

7. A coating as recited in claim 1, wherein said low refractive index material is a mixture of the high refractive index material and a second material.

8. A coating as recited in claim 1, wherein said high refractive index material is zirconium oxide.

9. A coating as recited in claim 1, wherein said high refractive index material is a material selected from the group consisting of $In_2O_3$, SiO, $Si_2O_3$, silicon oxynitride, $SnO_2$, ZnO, $Ta_2O_5$, $ZrO_2$, oxides and nitrides of metal silicides, and mixtures thereof.

10. A coating as recited in claim 1, wherein said high refractive index material is selected from the group consisting of $HfO_2$, $In_2O_3$, $Nb_2O_5$, $Si_3N_4$, silicon oxynitride, $SnO_2$, $TiO_2$, $Ta_2O_5$, oxides of metal silicides, ZnO, ZnS, and mixtures thereof.

11. A coating as recited in claim 1, wherein said high refractive index material is a mixture of at least two materials.

12. A coating as recited in claim 1, wherein said high refractive index material is a TiO and wherein said low refractive index material is a mixture of $TiO_2$ and $Al_2O_3$ in a ratio such that the mixture has a refractive index of about 1.9.

13. A coating as recited in claim 1, wherein said alternating layers include a medium refractive index material which is a mixture of the high refractive index material and the low refractive index material.

14. A coating as recited in claim 1, wherein the ratio of the index of refraction of the high refractive index material divided by the index of refraction of the low refractive index material in a range from about 1.2 to about 1.55.

15. A color splitter for separating light having visible wavelengths into different colors, the color splitter comprising:
   at least one light transmissive surface configured to receive light at high angles of incidence,
   a coating of alternating layers of at least two different dielectric materials on the at least one surface,
   the at least two different dielectric materials including a low refractive index material and a high refractive index material, the low refractive index material having a lower index of refraction than the index of refraction of the high refractive index material,
   the index of refraction of the low refractive index material and the index of refraction of the high refractive index material having an average refractive index which is no less than about 1.6,
   the index of refraction of the high refractive index material divided by the index of refraction of the low refractive index material yielding a ratio in a range from about 1.05 to about 1.55, whereby visible light encountering the coating at high angles of incidence is split into separate colors.

16. A color splitter as recited in claim 15, wherein said at least one light transmissive surface of the color splitter is configured such that the angle of incidence is effectively greater than about 20° in air.

17. A color splitter as recited in claim 15, wherein said high and low refractive index materials are deposited by a sputtering process.

18. A color splitter as recited in claim 15, wherein said low refractive index material is aluminum oxide.

19. A color splitter as recited in claim 15, wherein said low refractive index material is a material selected from the group consisting of In$_2$O$_3$, SiO, Si$_2$O$_3$, silicon oxynitride, SnO$_2$, ZnO, Ta$_2$O$_5$, ZrO$_2$, oxides and nitrides of metal silicides, and mixtures thereof.

20. A color splitter as recited in claim 15, wherein said low refractive index lomaterial is selected from the group consisting of MgF$_2$, Na$_3$AlF$_6$, SiO$_2$, oxides and nitrides of metal suicides, and mixtures thereof.

21. A color splitter as recited in claim 15, wherein said low refractive index material is a mixture of at least two materials.

22. A color splitter as recited in claim 15, wherein said low refractive index material is a mixture of the high refractive index material and a second material.

23. A color splitter as recited in claim 15, wherein said high refractive index material is zirconium oxide.

24. A color splitter as recited in claim 15, wherein said high refractive index material is a material selected from the group consisting of In$_2$O$_3$, SiO, Si$_2$O$_3$, silicon oxynitride, SnO$_2$, ZnO, Ta$_2$O$_5$, ZrO$_2$, oxides and nitrides of metal silicides, and mixtures thereof.

25. A color splitter as recited in claim 15, wherein said high refractive index material is selected from the group consisting of HfO$_2$, In$_2$O$_3$, Nb$_2$O$_5$, Si$_3$N$_4$, silicon oxynitride, SnO$_2$, TiO$_2$, Ta$_2$O$_5$, oxides of metal silicides, ZnO, ZnS, and mixtures thereof.

26. A color splitter as recited in claim 15, wherein said high refractive index material is a mixture of at least two materials.

27. A color splitter as recited in claim 15, wherein said high refractive index material is a TiO and wherein said low refractive index material is a mixture of TiO$_2$ and Al$_2$O$_3$ in a ratio such that the mixture has a refractive index of about 1.9.

28. A color splitter as recited in claim 15, wherein said alternating layers include a medium refractive index material which is a mixture of the high refractive index material and the low refractive index material.

29. A color splitter as recited in claim 15, wherein said ratio of the index of refraction of the high refractive index material divided by the index of refraction of the low refractive index material in a range from about 1.2 to about 1.55.

30. A color splitter as recited in claim 15, wherein said color splitter is a Philips prism.

31. A color splitter as recited in claim 15, wherein said color splitter is selected from the group consisting of beamsplitter cubes, cross or X-prisms, L-prisms, and two or more flat, tilted plate dichroic mirrors.

32. An image projection system comprising:
(a) polarizing means for polarizing light to transmit a first polarized component of light in a first polarization state;
(b) color splitting means for separating the first polarized component of light into at least two separate color beams such that at least two separate color beams exit in the first polarization state from the color splitting means,
the color splitting means having at least one surface configured to receive light at high angles of incidence,
the color splitting means having a coating of alternating layers of at least two different dielectric materials on the at least one surface configured to receive light at high angles of incidence,
the at least two different dielectric materials including a low refractive index material and a high refractive index material, the low refractive index material having a lower index of refraction than the index of refraction of the high refractive index material,
the index of refraction of the low refractive index material and the index of refraction of the high refractive index material having an average refractive index which is no less than about 1.6,
the index of refraction of the high refractive index material divided by the index of refraction of the low refractive index material yielding a ratio in a range from about 1.05 to about 1.55,
(c) imager means for modulating a polarization state of each color beam received from the color splitting means and for reflecting the beam thus modulated back to the color splitting means in a second polarization state.

33. A system as recited in claim 32, further comprising light source means for providing light to the polarizing means.

34. A system as recited in claim 32, wherein the light has wavelength ranges and wherein the system further comprises notch filter means for tuning the wavelength ranges of the light such that the light entering the color splitting means has selected wavelength ranges.

35. A system as recited in claim 32, further comprising convergent lens means for converging light such that the light entering the color splitting means is convergent.

36. A system as recited in claim 32, wherein the polarizing means is a polarizing beam splitter.

37. A system as recited in claim 32, wherein the polarizing means is a polarizing cubic beam splitter.

38. A system as recited in claim 32, wherein the color splitting means is a Philips prism.

39. A system as recited in claim 32, wherein the color splitting means is selected from the group consisting of beamsplitter cubes, X-prisms, L-prisms, and two or more flat tilted plate dichroic mirrors.

40. A system as recited in claim 32, wherein the imager means are three liquid crystal light valves.

41. A system as recited in claim 32, further comprising at least one waveplate compensator means for retarding at least one of the color beams to achieve a predetermined phase difference, wherein the waveplate compensator means is positioned such that the waveplate compensator means is in an optical path between the color splitting means and the imager means.

42. A system as recited in claim 32, wherein said low refractive index material is aluminum oxide.

43. A system as recited in claim 32, wherein said high refractive index material is zirconium oxide.

44. A system as recited in claim 32, wherein said ratio of the index of refraction of the high refractive index material divided by the index of refraction of the low refractive index material in a range from about 1.2 to about 1.55.

45. An image projection system comprising:
(a) polarizer for polarizing light to transmit a first polarized component of light in a first polarization state;
(b) color splitter for separating the first polarized component of light into at least two separate color beams such that at least two separate color beams exit in the first polarization state from the color splitter, the color splitter having at least one surface configured to receive light at high angles of incidence, the color splitter having a coating of alternating layers of at least two different dielectric materials on the at least one surface configured to receive light at high angles of incidence, the at least two different dielectric materials including a low refractive index material and a high refractive index material, the low refractive index material having a lower index of refraction than the index of refraction of the high refractive index material, the index of refraction of the low refractive index material and the index of refraction of the high refractive index material having an average refractive index which is no less than about 1.6, the index of refraction of the high refractive index material divided by the index of refraction of the low refractive index material yielding a ratio in a range from about 1.05 to about 1.55, and (c) imagers for modulating a polarization state of each color beam received from the color splitter and for reflecting the beam thus modulated back to the color splitter in a second polarization state.

46. A system as recited in claim 45, further comprising a light source for providing light to the polarizer.

47. A system as recited in claim 45, wherein the light has wavelength ranges and wherein the system further comprises a notch filter for tuning the wavelength ranges of the light such that the light entering the color splitter has selected wavelength ranges.

48. A system as recited in claim 45, further comprising a convergent lens for converging light such that the light entering the color splitter is convergent.

49. A system as recited in claim 45, wherein the polarizer is a polarizing beam splitter.

50. A system as recited in claim 45, wherein the polarizer is a polarizing cubic beam splitter.

51. A system as recited in claim 45, wherein the color splitter is a Philips prism.

52. A system as recited in claim 45, wherein the color splitter is selected from the group consisting of beamsplitter cubes, X-prisms, L-prisms, and flat tilted plate dichroic mirrors.

53. A system as recited in claim 45, wherein the imagers are three liquid crystal light valves.

54. A system as recited in claim 45, further comprising at least one waveplate compensator for retarding at least one of the color beams to achieve a predetermined phase difference, wherein the waveplate compensator is positioned such that the waveplate compensator is in an optical path between the color splitter and one of the imagers.

55. A system as recited in claim 45, wherein said low refractive index material is aluminum oxide.

56. A system as recited in claim 45, wherein said high refractive index material is zirconium oxide.

57. A system as recited in claim 45, wherein said ratio of the index of refraction of the high refractive index material divided by the index of refraction of the low refractive index material in a range from about 1.2 to about 1.55.

* * * * *